US005138312A

United States Patent [19]

Tsukamoto et al.

[11] Patent Number: 5,138,312

[45] Date of Patent: * Aug. 11, 1992

[54] PAGER WITH A TELEVISION FUNCTION

[75] Inventors: Akihiro Tsukamoto; Keiichi Kobayashi, both of Tokyo, Japan

[73] Assignee: Casio Computer Co., Ltd., Tokyo, Japan

[ * ] Notice: The portion of the term of this patent subsequent to Apr. 2, 2008 has been disclaimed.

[21] Appl. No.: 651,452

[22] Filed: Feb. 5, 1991

Related U.S. Application Data

[63] Continuation of Ser. No. 219,348, Jul. 14, 1988, Pat. No. 5,005,013

[30] Foreign Application Priority Data

Jul. 16, 1987 [JP] Japan ............................ 62-176047
May 12, 1988 [JP] Japan ............................ 63-115319

[51] Int. Cl.⁵ ............................ H04Q 7/00

[52] U.S. Cl. ............................ 340/825.44; 358/241; 340/825.47

[58] Field of Search ............................ 340/825.44, 825.47, 340/825.26, 825.27, 311.1; 358/241, 233, 85, 194.1, 254; 455/355, 352, 603; 379/96; 368/11

[56] References Cited

U.S. PATENT DOCUMENTS

| | | | |
|---|---|---|---|
| 3,976,995 | 8/1976 | Sebestyen | 340/825.44 |
| 4,010,322 | 3/1977 | Nathanson | 258/230 |
| 4,106,283 | 8/1978 | Yamashita | 358/241 |
| 4,581,654 | 4/1986 | Kobayashi et al. | 358/241 |
| 4,630,122 | 12/1986 | Morokawa | 358/241 |
| 4,639,225 | 1/1987 | Washizuka | 358/254 |
| 4,663,623 | 5/1987 | Lax | 340/825.44 |
| 4,786,902 | 11/1988 | Davis | 340/825.44 |
| 4,816,901 | 3/1989 | Music et al. | 358/85 |
| 5,005,013 | 4/1991 | Tsukamota et al. | 340/825.47 |

*Primary Examiner*—Donald J. Yusko
*Assistant Examiner*—Peter Weissman
*Attorney, Agent, or Firm*—Frishauf, Holtz, Goodman & Woodward

[57] ABSTRACT

A pager has a TV receiver for receiving a TV radio wave which causes the display to display a TV image. The pager has a color designation circuit for designating a display color of a message. The color designation circuit designates the display color of the message in accordance with a predetermined method for emphasizing the message. The display then displays the message in the designated color.

4 Claims, 20 Drawing Sheets

| | | | | | | | | | | | | | | | | |
|---|---|---|---|---|---|---|---|---|---|---|---|---|---|---|---|---|
| BIT NUMBER | 1 | 2 | 3 | 4 | 5 | 6 | 7 | 8 | 9 | 10 | 11 | 12 | 13 | 14 | 15 | 16 |
| BIT | 0 | 1 | 1 | 1 | 1 | 1 | 0 | 0 | 1 | 1 | 0 | 1 | 0 | 0 | 1 | 0 |
| BIT NUMBER | 17 | 18 | 19 | 20 | 21 | 22 | 23 | 24 | 25 | 26 | 27 | 28 | 29 | 30 | 31 | 32 |
| BIT | 0 | 0 | 0 | 1 | 0 | 1 | 0 | 1 | 1 | 1 | 0 | 1 | 1 | 0 | 0 | 0 |

FIG. 3E

| | | | | | | | | | | | | | | | | |
|---|---|---|---|---|---|---|---|---|---|---|---|---|---|---|---|---|
| BIT NUMBER | 1 | 2 | 3 | 4 | 5 | 6 | 7 | 8 | 9 | 10 | 11 | 12 | 13 | 14 | 15 | 16 |
| BIT | 0 | 1 | 1 | 1 | 1 | 0 | 1 | 0 | 1 | 0 | 0 | 0 | 1 | 0 | 0 | 1 |
| BIT NUMBER | 17 | 18 | 19 | 20 | 21 | 22 | 23 | 24 | 25 | 26 | 27 | 28 | 29 | 30 | 31 | 32 |
| BIT | 1 | 1 | 0 | 0 | 0 | 0 | 0 | 1 | 1 | 0 | 0 | 1 | 0 | 1 | 1 | 1 |

FIG. 3F

| FUNCTION BITS | | COLOR | MEANING |
|---|---|---|---|
| 0 | 0 | BLACK | NORMAL CONTACT |
| 0 | 1 | GREEN | PRIVATE CONTACT |
| 1 | 0 | BLUE | HOME CONTACT |
| 1 | 1 | RED | URGENT |

| TIME FROM RECEPTION | COLOR |
|---|---|
| 20 M | BLACK |
| 1 HOUR | BLUE |
| 2 HOURS | GREEN |
| OVER 2 HOURS | RED |

PAGER WITH A TELEVISION FUNCTION

This is a continuation application Ser. No. 219,348 filed Jul. 14, 1988 now Pat. No. 5,005,013.

BACKGROUND OF THE INVENTION

1. Field of the Invention

The present invention relates to a pager which can receive message data and can display a message on a screen.

2. Description of the Related Art

A pager which receives message data and can display a message on a display section is known. An arrangement of such a pager is disclosed in, for example, U.S. Pat. No. 3,976,995. The present application incorporates the disclosure of this U.S. Patent. The pager capable of displaying a message can display information of a call from where it is made, to whom it is made, and so on, resulting in much convenience. However, the conventional pager comprises a display corresponding to only one line, and cannot display a long message simultaneously.

In recent years, hand-held liquid crystal television sets are put into practical applications, and are widely used. A basic arrangement of a liquid crystal television is disclosed in U.S. Pat. No. 4,581,654. The present application incorporates the disclosure of this U.S. Patent. The liquid crystal television has a considerably larger display screen than that of the conventional pager. The pager and the liquid crystal television set are carried as hand-held devices. Therefore, if these devices are combined so that a message is displayed on a television screen, this results in convenience.

Since the conventional pager has a monochromatic display, message identification is not easy.

SUMMARY OF THE INVENTION

The present invention has been made in consideration of the above situation, and has as its object to provide a pager having a television receiving function.

It is another object of the present invention to provide a pager allowing easy identification of a displayed message.

In order to achieve the above objects, a pager according to the present invention, has radio receiving unit for receiving and demodulating a modulation signal including an identification number and message data;

identification number memory for storing a self identification number;

reception controller for discriminating whether the received identification number coincides with the identification number stored in said memory, and for, if it is determined that a coincidence is detected therebetween, reading the received message data;

message memory for storing the message data read by said reception controller;

television circuit for receiving and detecting a television radio wave;

display for displaying a television image received by said television circuit; and display controller for causing said display to display the message data stored in said message memory.

With the above arrangement, according to the pager of the present invention, a TV image can be displayed on a screen for displaying a message, resulting in much convenience.

Furthermore, a pager of the present invention has radio receiving unit for receiving and demodulating a modulation signal including an identification number and message data;

identification number memory for storing a self identification number;

reception controller for discriminating whether the received identification number coincides with the identification number stored in said memory, and for, if it is determined that a coincidence is detected therebetween, reading the received message data;

message memory for storing the message data read by said reception controller;

designator for designating a display color; and color display for displaying the message data stored in said message memory in a color designated by said designater.

With the above arrangement, according to the pager of the present invention, a displayed message can be colored and displayed, thus improving an identification of messages as compared with a conventional pager.

BRIEF DESCRIPTION OF THE DRAWINGS

FIGS. 1 to 12 show a first embodiment of the present invention, in which FIG. 1 is a front view showing an arrangement of an outer appearance, FIG. 2 is a block diagram showing the overall circuit arrangement, FIGS. 3A to 3F show data formats of the POCSAG scheme, FIG. 4 is a block diagram showing in detail a communication control circuit shown in FIG. 2, FIG. 5 is a view showing an internal arrangement of a message memory shown in FIG. 2, FIG. 6 is a block diagram partially showing a CPU shown in FIG. 2, FIG. 7 is a circuit diagram showing in detail a combine circuit shown in FIG. 2, FIG. 8 shows a flow chart and a timing chart showing an operation of the communication control circuit, FIG. 9 is a flow chart showing an operation of the CPU, FIG. 10 is a flow chart showing in detail message read step B16 in FIG. 9, FIG. 11 is a flow chart showing in detail display processing step B18, and FIG. 12 is a view showing a message write state of a display buffer;

FIGS. 14 to 23 show a third embodiment of the present invention, in which FIG. 14 is a block diagram showing the overall circuit arrangement, FIG. 15 is a view showing in detail a color selector, FIG. 16 is a table showing a storage format of a message memory, FIG. 18 is a flow chart showing in detail display processing, FIG. 20 is a flow chart showing another embodiment of color setting processing, FIG. 21 is a table showing set display colors according to function bits, FIG. 22 is a table showing set display colors according to elapsed times from reception of a message, and FIG. 23 is a flow chart showing message readout processing.

DETAILED DESCRIPTION OF THE PREFERRED EMBODIMENTS

Figure 1:
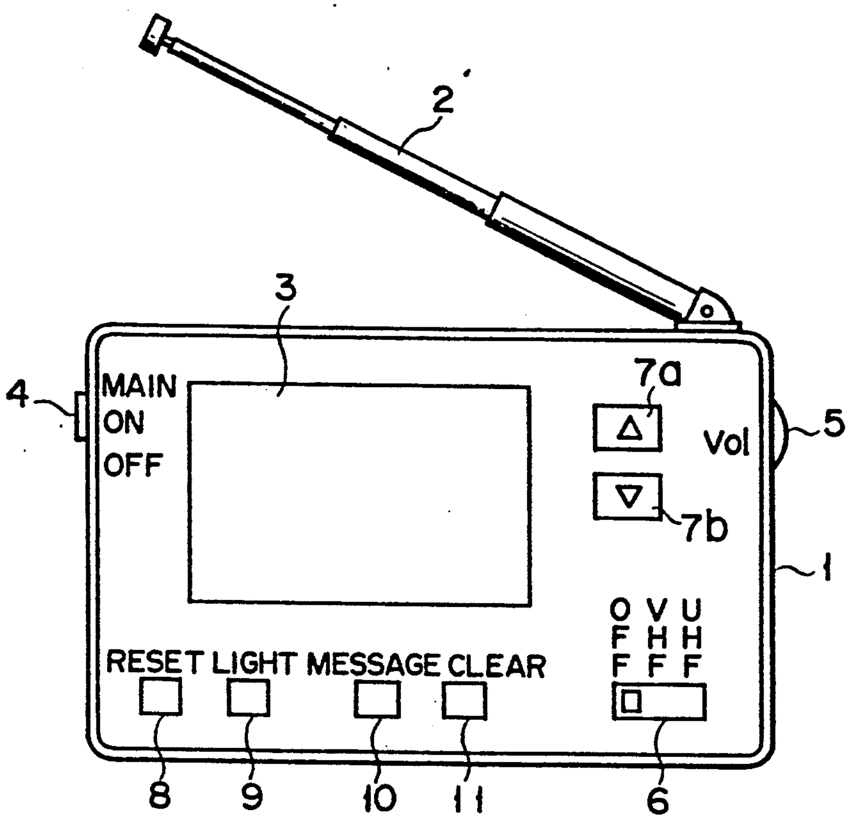

A first embodiment of the present invention will be described with reference to the accompanying drawings. First, the outer appearance of a pager according to the first embodiment will be described below with reference to FIG. 1. In FIG. 1, rod antenna 2 is arranged on an upper side portion of case 1, and liquid crystal display panel 3 is arranged on the front surface of case 1. Main switch 4 for turning on/off a paging function and tone volume control 5 are arranged on left and right sides of case 1 respectively. TV reception mode switch 6, search keys *7a* and *7b*, reset key 8, light key 9, message key 10, and clear key 11 are arranged on the front surface of case 1. TV reception mode switch 6 is used to switch the TV OFF, the VHF ON (VHF reception mode), and UHF ON (UHF reception mode). Search keys *7a* and *7b* are used to input an up/down tuning instruction in a TV reception mode, and to switch pages of a plurality of messages in a message display mode in a paging operation. Reset key 8 is a switch for stopping a call alarm when it is sounded. Light key 9 is a switch for turning on/off back light of liquid crystal display panel 3. Message key 10 is a switch for displaying message data. After the message display state has been set by key 10, search keys *7a* and *7b* may be operated so that messages can be switched. Clear key 11 is a switch for clearing a message displayed on liquid crystal display panel 3.

An electronic circuit provided in case 1 will be described below with reference to FIG. 2. Antenna 2 receives a TV broadcast radio wave and a radio wave generated from a radio transmission station of a telephone office. A 280-MHz radio wave is used as the radio wave output from the radio transmission station of a telephone office, a 280-MHz radio wave is used. The FM radio wave is modulated by an FSK (Frequency Shift Keying) signal (NRZ) scheme, and includes data at a bit rate of 512 bits/sec. A signal received by antenna 2 is input to receiver 21. Receiver 21 demodulates the FSK FM signal to obtain a signal consisting of logic "0" and "1" levels. Receiver 21 has a circuit for selecting 280 MHz; a demodulator for demodulating an FSK signal; and the like. Receiver 21 outputs the demodulated signal to communication control circuit 22. Communication control circuit 22 performs data processing of the signal sent from receiver 21 according to the POCSAG scheme. More specifically, control circuit 22 analyzes received data in accordance with the POCSAG scheme to check if the analyzed data coincides with a self call number (ID number assigned to a self pager). If the analyzed data coincides with the ID number assigned to the self pager, control circuit 22 outputs, to CPU 23, an reception/read instruction for instructing reception of the data. CPU 23 is connected to function buffer 24, key input unit 25, message memory 26, display buffer 27, loudspeaker 38, and the like. CPU 23 detects a signal from key input unit 25, and performs corresponding processing. CPU 23 stores the data received from the communication control circuit in message memory 26. CPU 23 reads out the storage data in response to the operation of search key *7a* or *7b*, and transfers the readout data to display buffer 27. CPU 23 drives loudspeaker 28 to generate a call alarm sound. Note that block F shown in CPU 23 is a flag memory in a second embodiment of the present invention, and will be described later in detail.

Of television radio waves received at antenna 2, TV tuner 30 selects a TV radio wave of a channel specified by tuning voltage VT from tuning control circuit 31. Tuner 30 converts the selected TV radio wave into an intermediate frequency signal, and outputs the signal to linear circuit 32. Linear circuit 32 comprises an intermediate frequency amplifier, a video detector, a video amplifier, an audio detector, an audio amplifier, a sync separator, and the like. Linear circuit 32 outputs a portion of the intermediate frequency signal output from the intermediate frequency amplifier to tuning control circuit 31, a video signal output from the video amplifier to A/D converter 33, an audio signal output from the audio amplifier to loudspeaker 34, and vertical sync signal V.SYNC and horizontal sync signal H.SYNC from the sync separator to timing control circuit 35, respectively. Timing control circuit 35 generates a variety of timing signals in response to sync signals V.SYNC and H.SYNC from linear circuit 32, and outputs fundamental clock signals $\phi 1$ and $\phi 2$ to A/D converter 33, and fundamental clock signals $\phi 1$ and $\phi 2$, arithmetic clock signals $\phi 10$ and $\phi 20$, and shift data $\phi DT$ and clock signal $\phi L$ for display control to CPU 23. Arithmetic clock signals $\phi 10$ and $\phi 20$ have longer periods than fundamental clock signals $\phi 1$ and $\phi 2$. CPU 23 controls operations of the respective sections in accordance with the timing signals from timing control circuit 35. In addition, when search key *7a* or *7b* of key input unit 25 is operated in the TV reception mode, CPU 23 outputs an up/down instruction to tuning control circuit 31.

A/D converter 33 samples the video signal sent from linear circuit 32 in synchronism with fundamental clock signals $\phi 1$ and $\phi 2$, and converts it into 4-bit video data. Converter 33 supplies the video data to combine circuit 36. Combine circuit 36 receives message data stored in message memory 26 and read out by CPU 23. The message data is 1-bit data, and video data is 4-bit data. For this reason, combine circuit 36 converts message data of logic "1" into 4-bit data "1111", and converts message data of logic "0" into 4-bit data "0000". Combine circuit 36 selects one of video data from A/D converter 33 and message data from CPU 23 in response to a switching signal from CPU 23, and outputs the selected data to segment driver 37. Segment driver 37 receives fundamental clock signals $\phi 1$ and $\phi 2$, latch clock signal $\phi L$, and clock signal $\phi C$ for generating a gradation signal. Segment driver 37 stores the 4-bit data sent from combine circuit 36 for one line in synchronism with fundamental clock signals $\phi 1$ and $\phi 2$. Thereafter segment driver 37 generates a gradation signal in accordance with the storage data, and supplies the generated signal to the segment electrodes of liquid crystal display panel 3. The common electrodes of liquid crystal display panel 3 are connected to common driver 38. Common driver 38 sequentially shifts shift data $\phi DT$ supplied from timing control circuit 35 in synchronism with clock signal $\phi L$, thereby generating common signals. Note that shift data $\phi DT$ is synchronous with vertical sync signal V.SYNC.

Liquid crystal display panel 3 is illuminated by back light 39 from the rear surface side. Back light 39 is driven by CPU 23. CPU 23 has a timer function (not shown), and always counts present time.

Data formats complying with the POCSAG scheme used in this embodiment will be described with reference to FIGS. 3A to 3F.

Figure 3A:
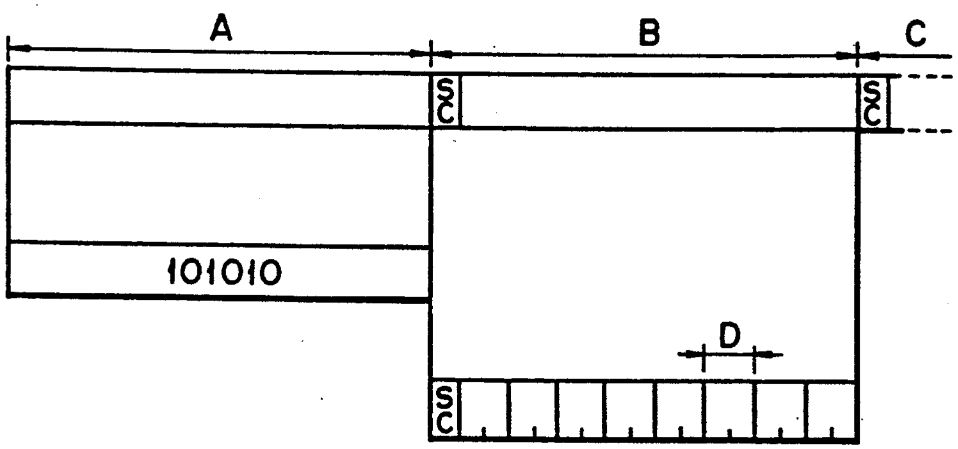

FIG. 3A shows the overall transmission signal format. As shown in FIG. 3A, data of the POCSAG scheme consists of preamble data (signal) A; and a plurality of following batch data (signals) B, C, . . . . The preamble data is a signal for causing the pager to recognize that data will be sent so as to perform synchronization. The preamble data has 576 bits, and data follows like 1010 . . . 10. Communication control circuit 22 detects the preamble data, and recognizes that batch data B, C, . . . sequentially follow.

Figure 3B:
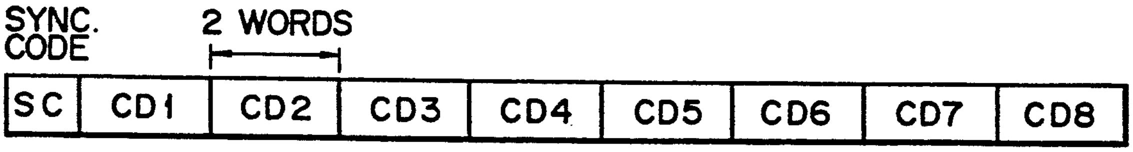

FIG. 3B shows a format of one of batch data B, C, . . . . The batch data has one-word sync code SC, and a plurality of code data. Each code data is 2-word data. For example, in this embodiment, one word =32 bits, and one batch data includes eight blocks CD1 to CD8. Therefore, one batch data consists of 544 bits (=32×2×8+32).

Figure 3C:
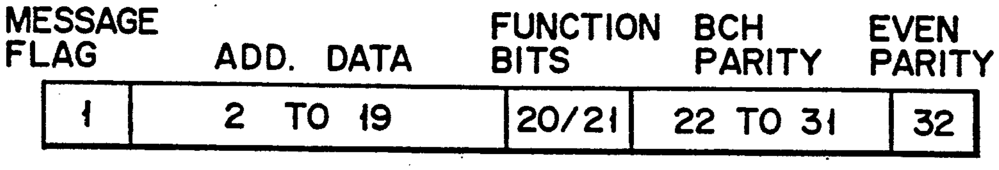
Figure 3D:
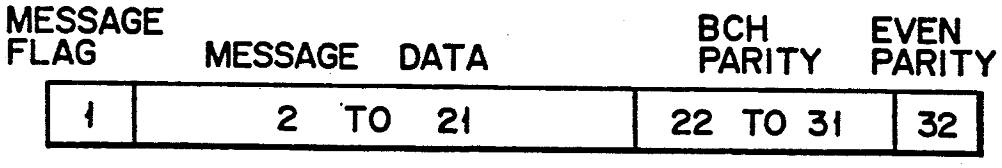

FIGS. 3C and 3D show formats of code data DC1 to DC8 for two words. FIG. 3C shows address code data, which consists of a message flag corresponding to the start bit followed by address code bits, function bits, BCH parity bits, and an even parity bit.

The message flag is a flag for identifying whether the code data is address data or message data. If the message flag is "0", the code data is address code data; and when "1", the code data is message code data. The 2nd to 19th bits following the message flag are address code bits, and correspond to the ID number described above. The 20th and 21th bits are function bits. The function bits are bits indicating a display mode and an alarm mode, and represent four types of functions in combinations of, e.g., "00", "01", "10", and "11". In the POCSAG scheme, an error may be generated in one code. e.g.. an address code. In particular, when a reception state is not good, an FSK signal cannot be completely demodulated, resulting in an error. In order to correct this error, the 22th to 31th bits serve as BCH parity bits. When an error occurs, correction is performed by this 10-bit data. This correction is called a BCH parity check. Thereafter, the 32th bit corresponds to an even parity bit. The even parity bit represents whether the total number of bits "1" from the start bit to the end bit corresponds to an odd or even number. For example, when one bit which should be "0" is erroneously set to be "1", it can be determined by the even parity check if a bit is added or omitted.

In the case of message code data shown in FIG. 3D, message data follows a message flag. The message data represents a message from a calling party, e.g., a telephone number and other information. The 22th to 31th bits correspond to BCH (Bose-Chaudhuri-Hocquenghem) parity data, and the 32th bit corresponds to an even parity bit.

In the POCSAG scheme, the power supply of receiver 21 is not kept on but is turned on when necessary. Each pager is assigned with one of eight blocks CD1 to CD8 in one batch, and a signal for detecting the position of the assigned block is a sync code word. The pager keeps the power supply ON during a period corresponding to the sync code and the assigned block. Note that preamble data A is data for performing the overall synchronization. When the synchronization fails, the power supply is turned on to receive preamble data A. FIG. 3E shows a bit format of the sync code, which consists of "01111100110100100001010111011000". When receiver 21 receives a signal with this bit pattern, it receives one block assigned thereto from several blocks following the received signal. The pager is set in a reception state for a time interval of the sync code, thus detecting the sync code. Thereafter, the pager turns off the power supply, and turns on the power supply again for an interval corresponding to the code word of the block assigned thereto, e.g., CD2 in FIG. 3B. The pager checks if the received code data, e.g., address data shown in FIG. 3C is data of its own. If not, the pager turns off the power supply.

If a coincidence is detected, the pager receives the following message code word, and reads the data. When the pager receives the sync code, it turns on the power supply of receiver 21 when the code word of a block assigned thereto is detected. More specifically, the pager turns on the power supply when the sync code and the block assigned thereto are detected. Since the overall synchronization is not taken in the initial power ON state of the pager, the power supply of receiver 21 is periodically turned on to detect preamble data. To summarize the above-mentioned POCSAG scheme, when the pager detects the preamble data, it turns on the power supply of receiver 21 when the sync code is received and when the code word assigned thereto is received.

These control operations are performed by communication control circuit 22. When control circuit 22 turns on receiver 21, receiver 21 performs a reception operation. For example, when the preamble data can be detected and the overall synchronization can be taken, control circuit 22 turns on the power supply of receiver 21 when the sync code and a block assigned thereto are received. The above-mentioned ON/OFF operation can save power consumption.

In the POCSAG scheme, one-word idling code data is provided in addition to the above-mentioned code data. FIG. 3F shows a bit format of the idling code data. The idling code data is a null code. When this code data is received, it is equivalent that the pager receives nothing. For example, if the idling code data is located at the position of the sync code data and is received, it means a synchronization. When the idling code data is present in the address code data or message code data, it is equivalent that no data is received.

The main portion shown in FIG. 2 will be described hereinafter in detail.

Figure 4:
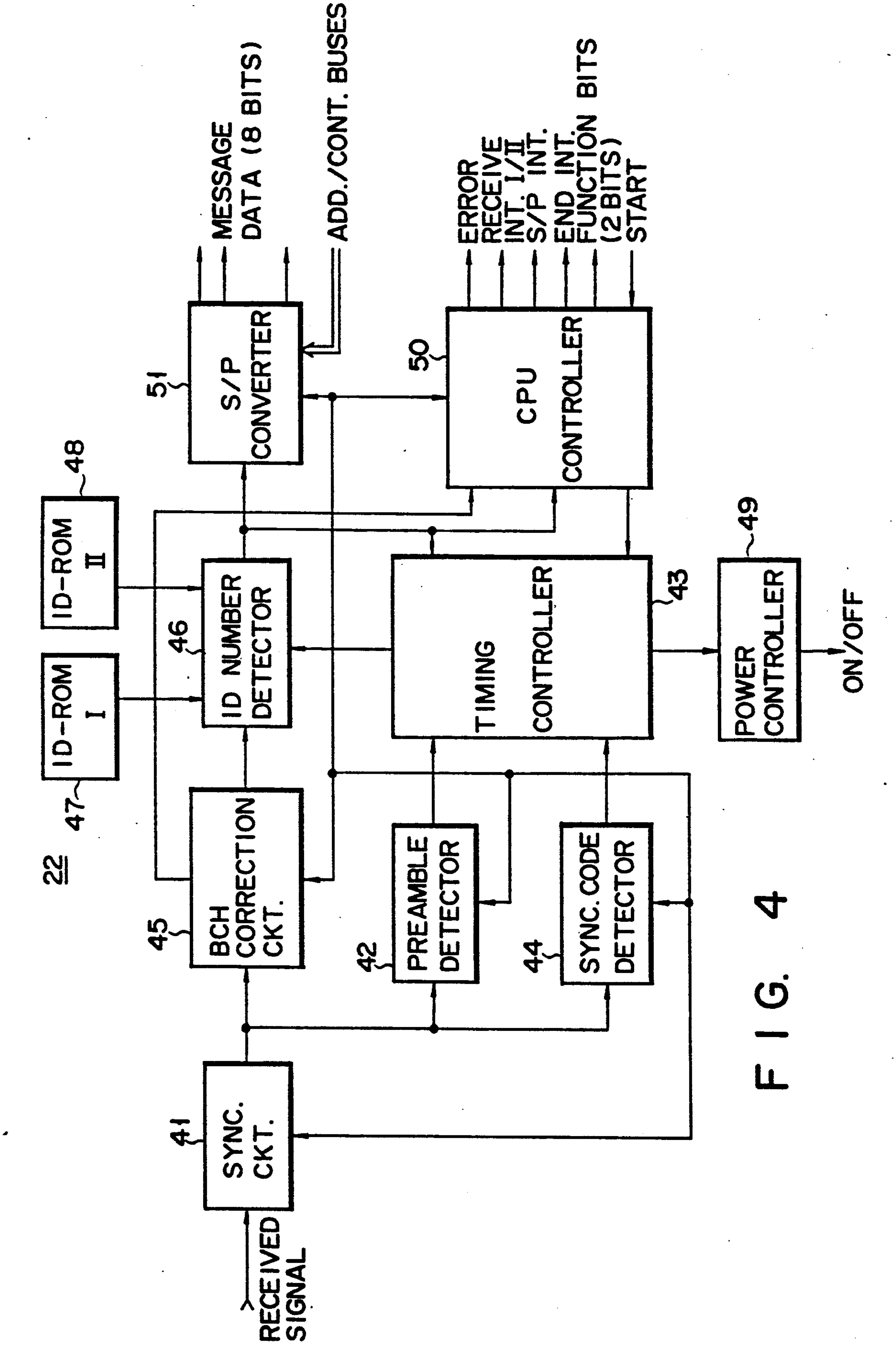

FIG. 4 is a detailed block diagram of communication control circuit 22. A received signal input from receiver 21 is input to input sync circuit 41. Sync circuit 41 is a circuit for correcting a "0" or "1" signal error for demodulation of the FSK signal, and can allow reading of stable data. The signal read by sync circuit 41 is applied to BCH correction circuit 45, preamble detector 42, and sync code detector 44. Preamble detector 42 detects preamble data, and sends the detection signal to timing controller 43. When the preamble data is detected by preamble detector 42, sync code detector 44 is then operated to detect whether the sync code is input, and outputs the detection signal to timing controller 43. BCH correction circuit 45 fetches all the data of a block assigned to the self pager of the batch format, and checks the presence/absence of a BCH error. When the BCH error is detected, circuit 45 performs correction. When an address code is received, BCH correction circuit 45 supplies corrected code data to ID number detector 46. ID number detector 46 is connected to ID-ROM I 47 and ID-ROM II 48 which store ID number addresses. ID number detector 46 compares the corrected address data and data stored in ID-ROMs 47 and 48 to detect a coincidence therebetween. The pager of this embodiment has first and second addresses, and ID-ROM I 47 stores the first address and ID-ROM II 48 stores the second address. Timing controller 43 has a clock signal for always detecting a timing for the sync code. A transmitter sequentially transmits preamble data and a plurality of batch data. When timing controller 43 detects the preamble data, it turns on power controller 49 until the sync code is detected. In addition, controller 43 turns on power controller 49 at a timing for which code data of a block corresponding to the self pager is transmitted. When an ON signal is output from power controller 49, BCH correction circuit 45 corrects received data, and supplies the corrected data to ID number detector 46. ID number detector 46 detects if the input data is the same as a self ID number (assigned to the self pager). If the input data does not coincide with the self ID number, detector 46 ends the detection operation, and detects a code word again.

If the input data coincides with the self ID number (of this pager), ID number detector 46 generates a coincidence signal. The coincidence signal is supplied to CPU controller 50. In response to the coincidence signal, CPU controller 50 supplies a receive interrupt signal to CPU 23. In response to the receive interrupt signal, CPU 23 performs processing to be described later.

Data to be received later or data currently received and stored in BCH correction circuit 45 is input to S/P converter 51 through ID number detector 46. S/P converter 51 converts serial data into 8-bit parallel data, and supplies the converted data to CPU 23. S/P converter 51 is connected to an address/control bus and a data bus (to be described later) of CPU 23. Each time detector 46 outputs 8-bit data, CPU controller 50 outputs an interrupt signal; and in response to this, CPU 23 fetches the 8-bit data.

When communication control circuit 22 receives all the data, CPU controller 50 outputs an end interrupt signal. Two function bits included in the address code are stored in a buffer in CPU 23. This storage operation is made under the control of CPU controller 50. Message code data is subjected to error correction by BCH correction circuit 45, and corrected data is converted to 8-bit parallel data by S/P converter 51. Then, the 8-bit data is supplied to CPU 23.

Communication control circuit 22 is always operated when main switch 4 is ON states. Timing controller 43 of control circuit 22 controls power controller 49 to turn on/off the power supply, thus reducing power consumption of the entire pager.

Figure 2:
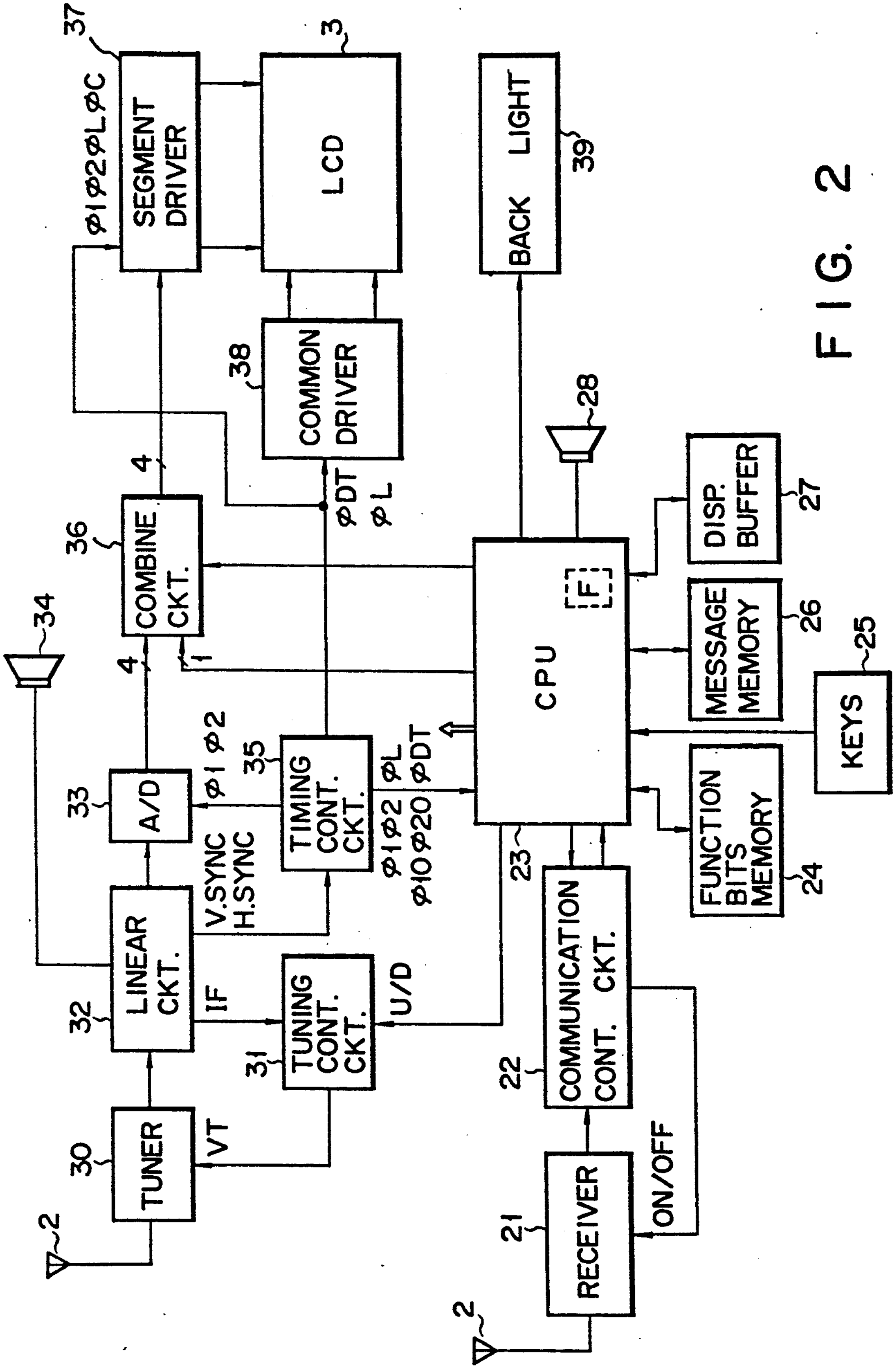
Figure 5:
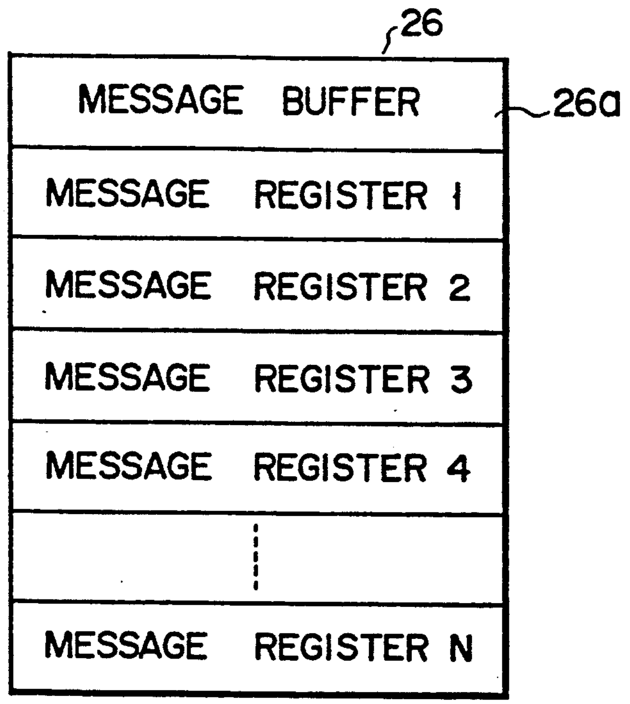

FIG. 5 shows in detail message memory 26 shown in FIG. 2. Message memory 26 is constituted by message buffer 26a and n message registers 1 to N. A received message is temporarily stored in message buffer 26a, and is then written in message register 1. In this case, data stored in message register 1 is shifted to register 2, data stored in register 2 is shifted to register 3, . . . . Data stored in register N is shifted out and erased. More specifically, message memory 26 has a FIFO buffer structure.

Figure 6:
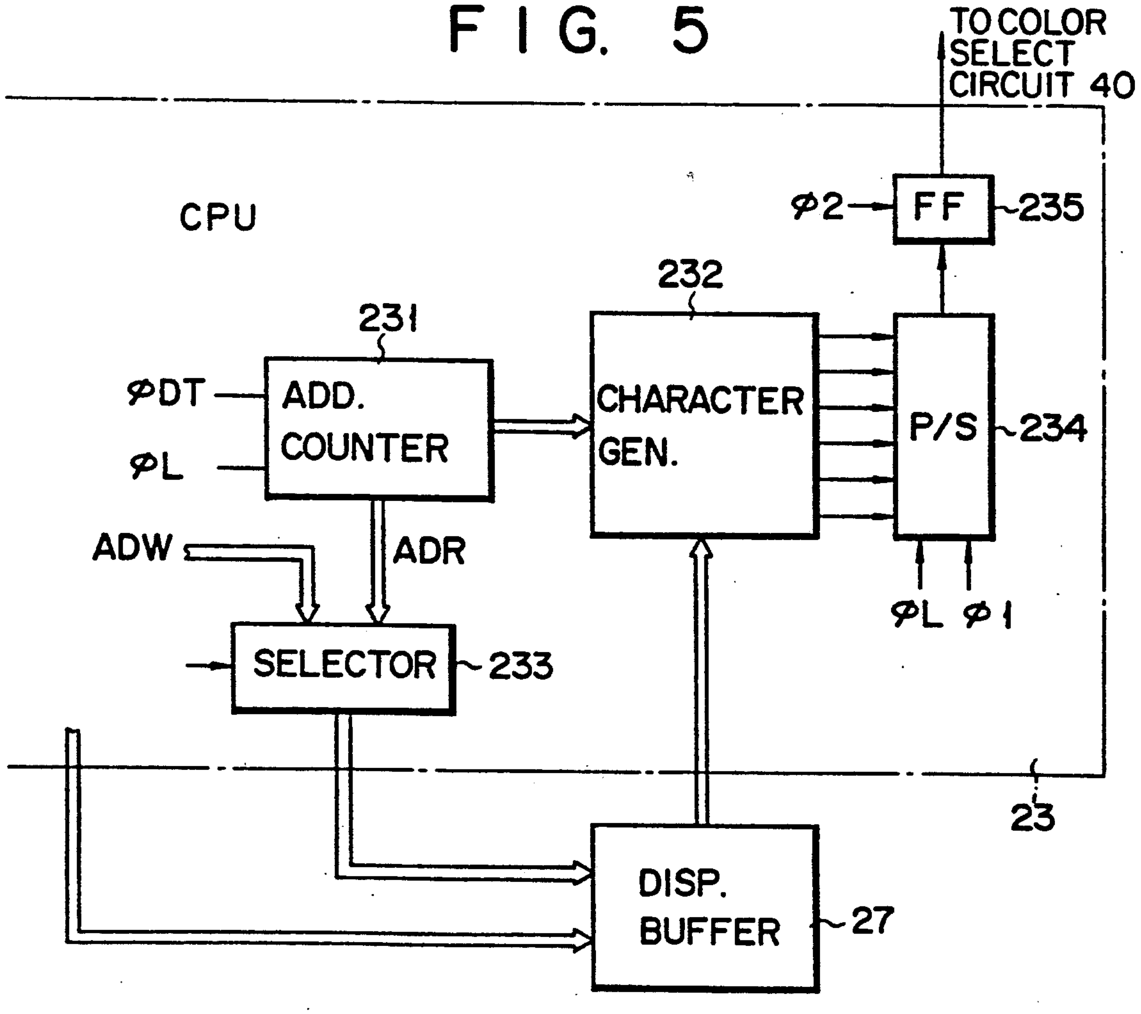

FIG. 6 shows in detail the main portion of CPU 23, i.e., a portion for converting message data stored in display buffer 27 into 1-bit serial data for displaying and outputting the 1-bit data to combine circuit 36. In FIG. 6, address counter 231 performs a count-up operation in accordance with clock signal $\phi L$, and is reset in response to shift data $\phi DT$. The count value of address counter 231 is supplied to character generator 232 as address data and is also sent to display buffer 27 through selector 233 as a read address. Display buffer 27 receives a write address from a control unit (not shown) in CPU 23 through selector 233. In response to a control signal from the control unit, selector 233 selects address data ADW from the control unit in a write cycle, and selects address data ADR in a read cycle. Selector 233 supplies the selected data to display buffer 27. Display buffer 27 has a capacity capable of storing display character data for one frame. Display buffer 27 stores message data sent from message memory 26 through CPU 23 in accordance with write address data ADW in the write mode. In the read mode, buffer 27 reads out storage data in accordance with read address data ADR, and sequentially outputs the readout data to character generator 232. Character generator 232 generates 6-bit character data based on the data from display buffer 27 in accordance with an address designated by address counter 231, and outputs the generated data to P/S converter 234. P/S converter 234 latches the 6-bit data in synchronism with latch clock signal $\phi L$, and outputs the latched data bit by bit in synchronism with fundamental clock signal $\phi 1$. The bit data output from P/S converter 234 are written in flip-flop 235 in synchronism with fundamental clock signal $\phi 2$, and are then sent to combine circuit 36 shown in FIG. 2.

Figure 7:
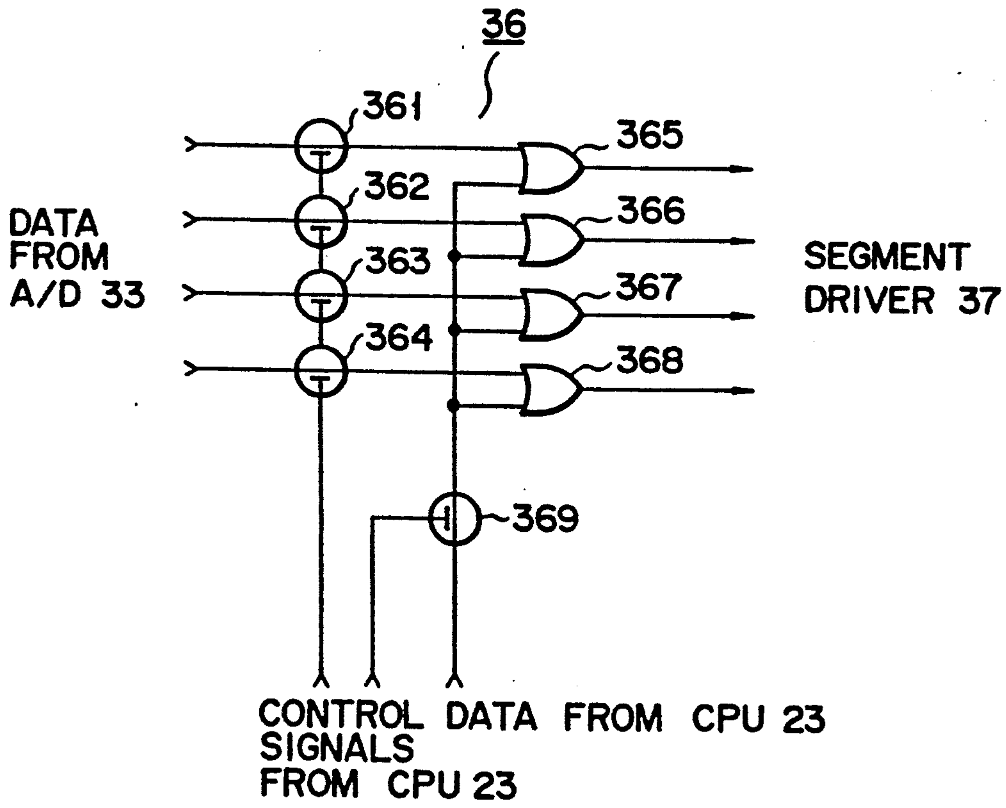
Figure 8:
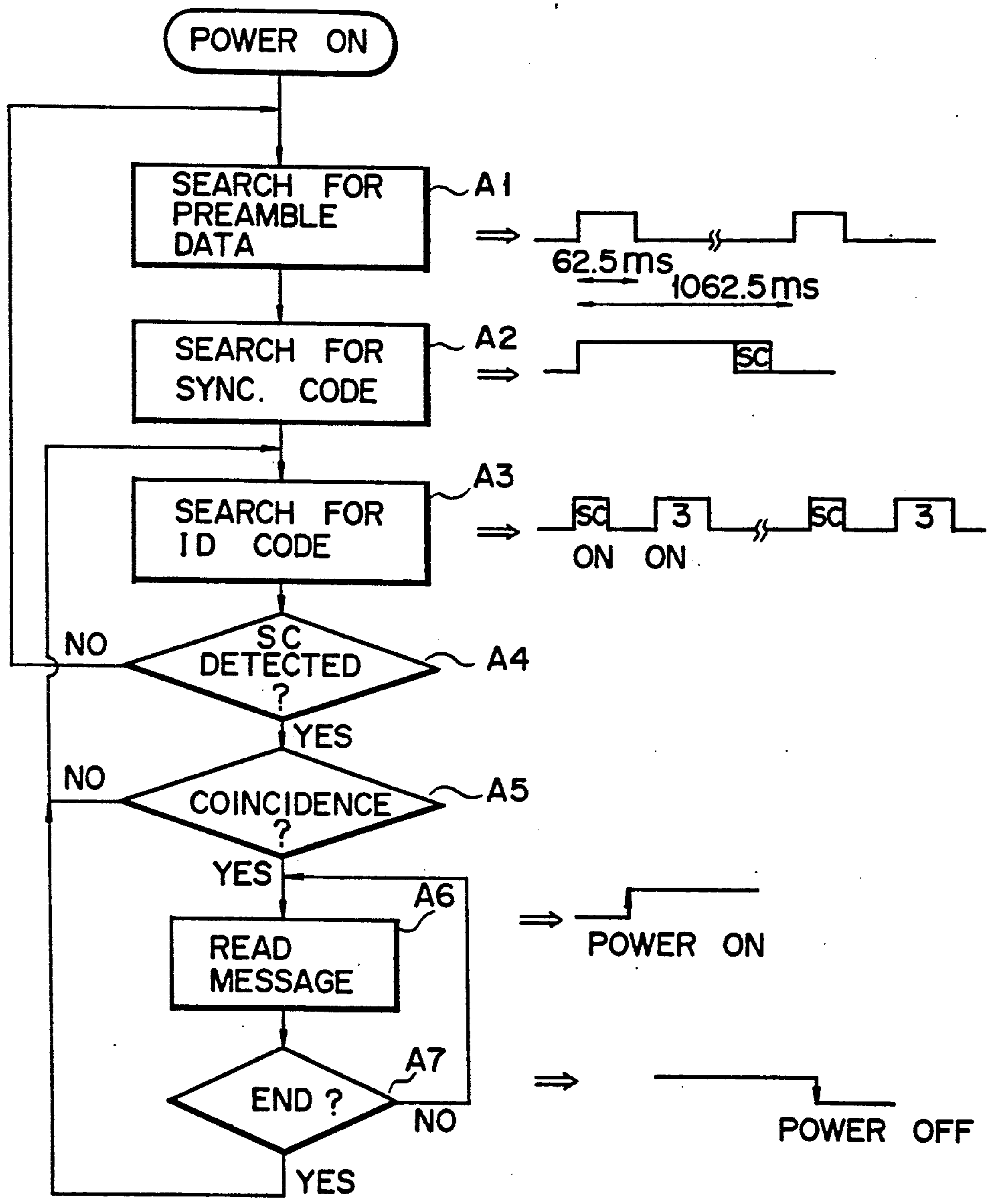

Combine circuit 36 is arranged as shown in FIG. 7. More specifically, 4-bit TV video data sent from A/D converter 33 shown in FIG. 2 is input to OR gates 365 to 368 through gate circuits 361 to 364. 1-bit message data sent from CPU 23 is input to OR gates 365 to 368 through gate circuit 369. Gate circuits 361 to 364 and 369 are ON/OFF controlled by control signals from CPU 23. In the TV reception mode, CPU 23 turns on gate circuits 361 to 364 and turns off gate circuit 369. However, if the paging operation is performed in the TV reception mode, gate circuit 369 is turned on, and TV video data and message data of the paging operation are mixed by OR gates 365 to 368. Then, 4-bit data output from OR gates 365 to 368 is sent to segment driver 37 shown in FIG. 2.

The operation of this embodiment will be described with reference to FIGS. 8 to 12. When the power switch of the pager is turned on, the pager executes the operation shown in the flow chart of FIG. 8 by communication control circuit 22. More specifically, when the power switch 4 of the pager is turned on, communication control circuit 22 searches preamble data (step A1). The search request is output from timing controller 43. When input data continues like "10101010", preamble detector 42 supplies a preamble detection signal to timing controller 43. Timing controller 43 causes sync code detector 44 to start a detection operation of a sync code in response to the preamble detection signal. The sync code appears immediately after the preamble data. When batch data are successively input, sync code appears at the beginning of each batch data. Upon first detection of the preamble data, timing controller 43 causes sync code detector 44 to operate immediately after the preamble detection signal is output. When sync code detector 44 detects the sync code in step A2, timing controller 43 causes BCH correction circuit 45 to read data of a block assigned to the self pager. When the data of the block assigned to the self pager is read, timing controller 43 causes ID number detector 46 to operate so as to execute processing for detecting if the received code coincides with the contents of ID-ROM I 47 and ID-ROM II 48, i.e., processing shown in step A3. In general, the sync code may not often be detected due to noise components. In this embodiment, the sync code is detected twice. When the sync code cannot be detected in the two detection operations, out of phase is determined. In this case, preamble search processing in step A1 is restarted.

When the sync code is detected once or twice, it is checked in step A5 if the received ID code coincides with the prestored ID code. If the ID codes do not coincide with each other, word search (ID code search) is executed again in step A3.

If the ID codes coincide with each other, a message is read (step A6). The reading operation is performed by CPU 23, as will be described later. Serial data output from ID number detector 46 is converted to 8-bit parallel data by S/P converter 51, and the parallel data is sent to CPU 23. When CPU 23 completes data reading, i.e., when step A6 is completed, it is checked in step A7 if the message is ended. More specifically, the message flag at the first bit of the message code data is checked. If the message flag is "1", it is determined that the message data follows. However, if the message flag is "0", it is determined that the message is ended. If the message is not ended (i.e., if NO in step A7), timing controller 43 reads a message again, and executes the operation in step A7. As described above, this operation is performed in units of 8 bits. For example, it is checked if all the 20 bits (i.e., 2nd to 21st message bits) are read, i.e., the message is ended. If YES in step A7, i.e., if it is determined that the message is ended, the flow returns to step A3 to execute ID code search processing again. When no preamble data is detected upon power ON operation or preamble data is erroneously detected, synchronization cannot be established. Therefore, the sync code cannot be detected in two detection operations. In this case, timing controller 43 performs processing from the preamble search processing in step A1.

In step A1, the power supply of receiver 21 is turned on for 62.5 msec to check if the received data is preamble data. If the received data is not preamble data, the power supply of receiver 21 is turned on after the lapse of 1000.0 msec to perform preamble search processing in step A1 again. The preamble search processing is repeated, so that preamble data transmitted before batch data can always be detected.

As described above, timing controller 43 periodically turns on the power supply of receiver 21, detects preamble data during the ON interval, performs synchronization, and thereafter, temporarily turns off the power supply. Controller 43 turns on the power supply only while a block assigned to the self pager is transmitted. Thus, power consumption can be reduced.

The processing operation of CPU 23 will be described below with reference to the flow chart in FIG. 9. When the power supply of the pager is turned on by main switch 4, CPU 23 is set in a HALT state as shown in step B1 in FIG. 9 to prepare for interruption by various key inputs at key input unit 25, receive interruption, timer interruption, and the like. In this state, when the mode is switched by mode switch 6, interruption in step B2 is made. Then, one of the "TV OFF", "VHF ON", and "UHF ON" operation modes shown in steps B4, B5, and B6 is designated through decision step B3. When the "TV OFF" mode is selected, the flow returns to the HALT state of step B1 to prepare for interruption by the next key input or the like. Processing operations in steps B7 and B8 following step B4 and processing operation in step BA1 following steps B5 and B6 are those according to another embodiment of the present invention, and will be described later in detail. When the "VHF ON" mode in step B5 and the "UHF ON" mode in step B6 are selected, the power supply of the TV reception circuit system shown in FIG. 2 is turned on, and a broadcast radio wave of a designated channel among those received at antenna 2 is selected by tuner 30, and the selected radio wave signal is sent to linear circuit 32. A video signal output from linear circuit 32 is converted to 4-bit digital data by A/D converter 33, and is then supplied to combine circuit 36. Since gate circuits 361 to 364 in combine circuit 36 (FIG. 7) are kept on in response to the control signal from CPU 23 in the TV reception mode, the video data output from A/D converter 33 is supplied to segment driver 37, and is displayed on liquid crystal display panel 3. In this case, common driver 38 generates a common signal based on the timing signal from timing control circuit 35, and selectively drives the common electrodes of the liquid crystal display panel 3.

When the operator operates search key 7*a* or 7*b* in the TV reception mode, interruption shown in step B9 is made, and it is checked in step B10 if the operation mode at that time is the TV mode or the message display mode. If the Tv mode is selected, an auto-tuning operation shown in step B11 is performed. More specifically, when the operator operates search key 7*a* or 7*b*, up/down signal U/D is output from CPU 23 in accordance with the operation, and tuning control circuit 31 changes tuning control voltage VT based on signal U/D. Tuner 30 performs channel selection in accordance with tuning control voltage VT. Tuning control circuit 31 performs tuning control based on intermediate frequency signal IF from linear circuit 32 to correctly select a channel. After the auto-tuning operation is completed, the flow returns to step B1. If it is determined in step B10 that the message display mode is selected, display data switching processing in step B12 (to be described later in detail) is executed, and the flow then returns to step B1.

CPU 23 has an internal timer function, and periodically performs timer interruption shown in step B13 regardless of the operation mode. In step B14, CPU 23 executes timer processing, and thereafter, the flow returns to step B1.

When the paging operation is performed, i.e., when the reception interrupt signal is output from ID number decoder 46, CPU 23 performs receive interruption shown in step B15, and performs message read processing in step B16.

Figure 9:
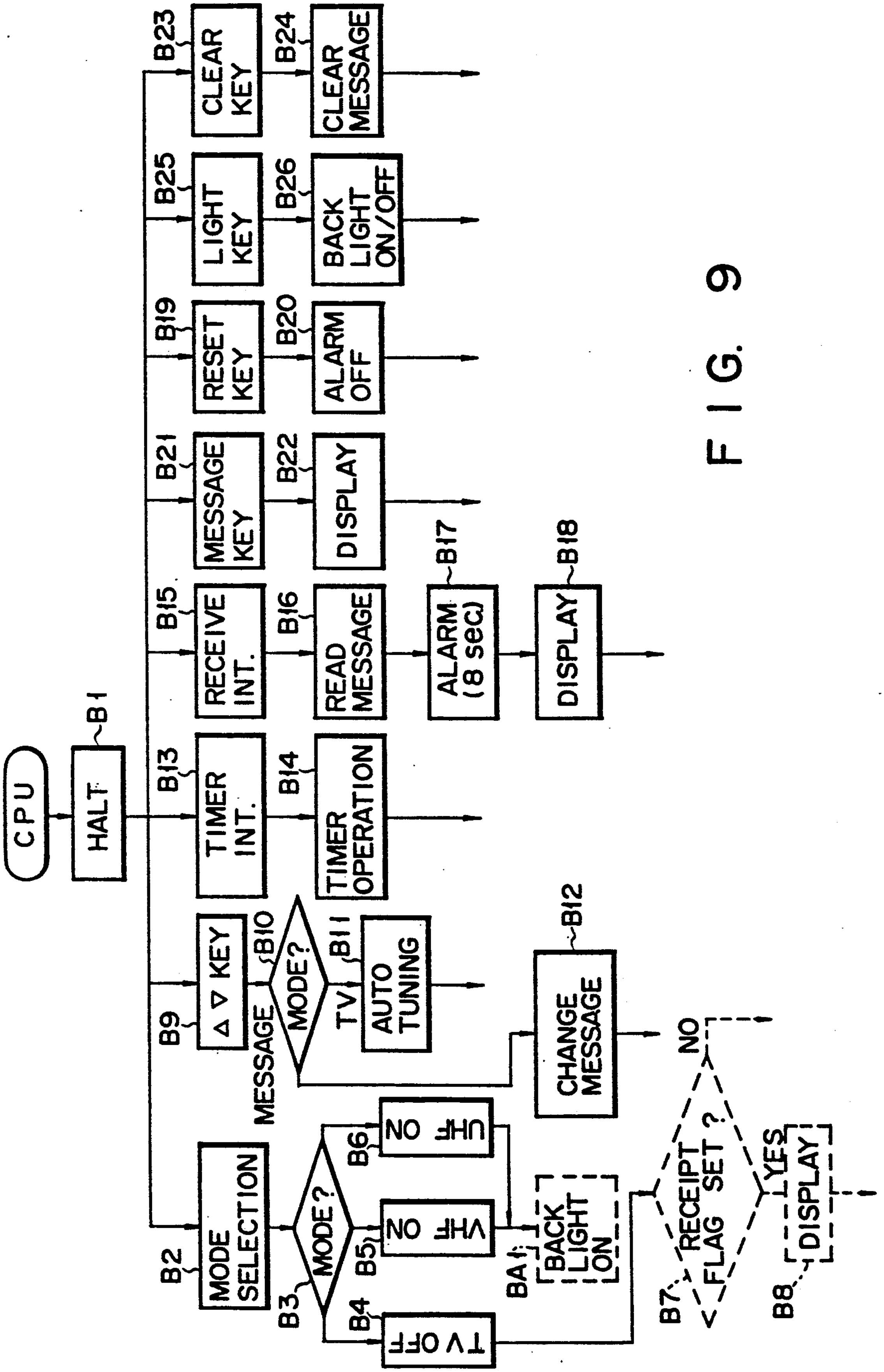
Figure 10:
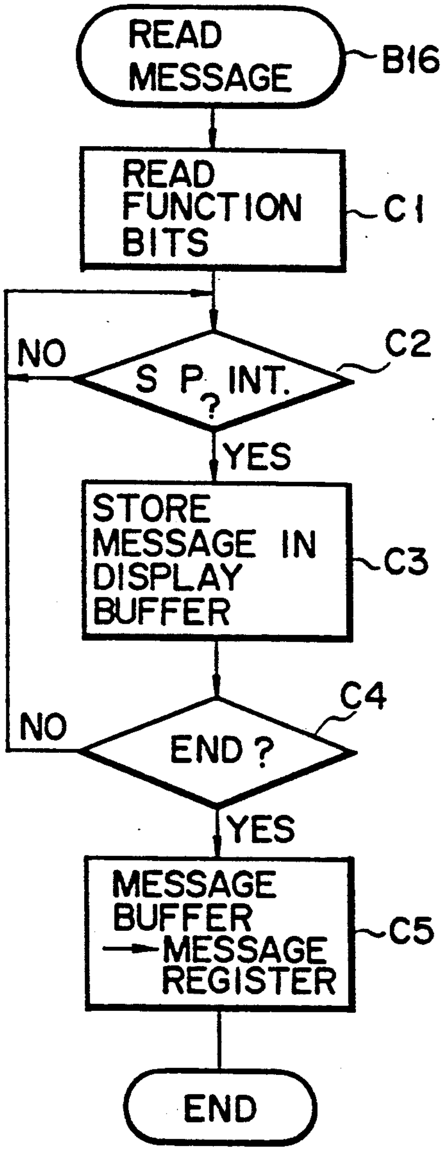

The message read processing (step B16) is executed in accordance with the flow chart shown in FIG. 10 in detail. In step C1, function bits are read in function buffer 24. It is then checked in step C2 if an S/P interrupt signal is supplied from CPU controller 50. If no interrupt signal is supplied, the HALT state is kept until the S/P interrupt signal is output. If the S/P interrupt signal is detected in step C2, 8-bit serial data is converted into 8-bit parallel data by S/P converter 51. The converted 8-bit parallel data is stored in message buffer 26*a* in message memory 26 in step C3. It is checked in step C4 if the message is ended. If NO in step C4, the flow returns to step C3. However, if YES in step C4, the flow advances to step C5. The data read in message buffer 26*a* is stored in the corresponding register area of message memory 26. Thus, the message read processing is completed. Thereafter, the flow returns to step B17 in FIG. 9.

In step B17, an alarm operation is performed. That is, loudspeaker 28 is driven for a predetermined period of time, e.g., 8 seconds, thus signaling to the user that the paging operation was made. After the lapse of 8 seconds, the alarm is automatically turned off. When the operator wants to stop the alarm during an 8-second interval, he operates reset key 8. Upon operation of the reset key 8, interruption in step B19 is performed, and the alarm is turned off in step B20. When the alarm is turned off after the processing in step B17 or B20 is completed, display processing in step B18 is executed.

Figure 11:
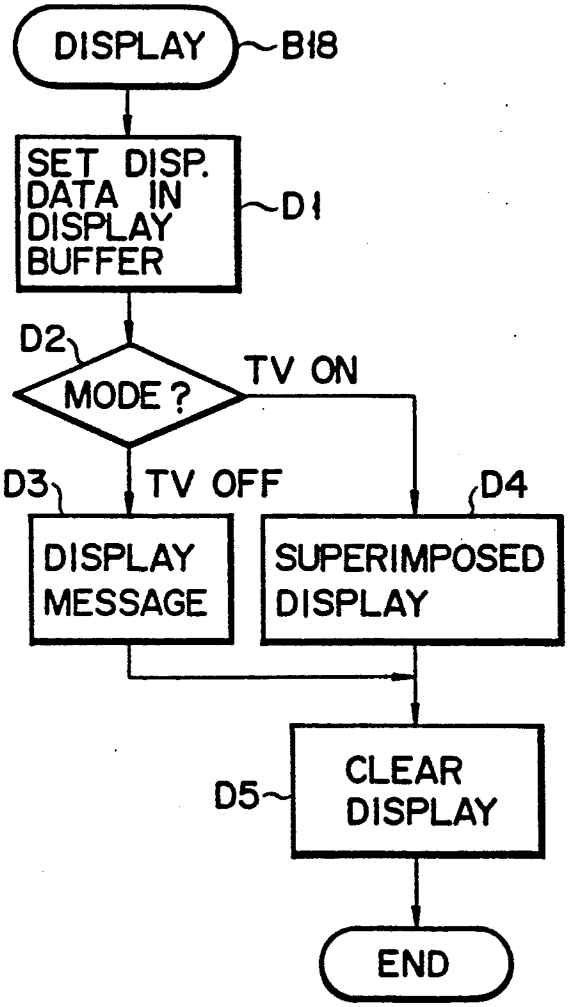
Figure 12:
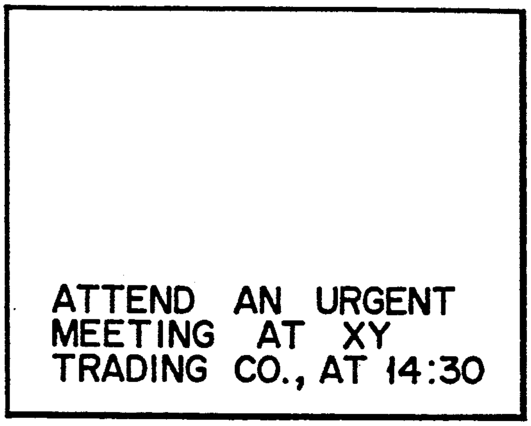

The display processing in step B18 is executed in accordance with the flow chart shown in FIG. 11. In step D1, display data is set in display buffer 27. Message data stored in message register 1 of message memory 26 is first read out, and is written in only a lower portion of display buffer 27, as shown in FIG. 12. An upper portion of display buffer 27 is left blank. It is checked in step D2 if the operation mode at that time is the TV ON or OFF mode. If the TV OFF mode is set, the message data held in display buffer 27 is read out in step D3, and is displayed on liquid crystal display panel 3. The display operation will be described below in detail. In FIG. 6, character generator 232 sequentially reads out message data stored in display buffer 27 in accordance with the count value of address counter 231. Character generator 232 converts the input data into 6-bit character data. The character data is latched by P/S converter 234 in synchronism with latch clock signal $\phi L$, and thereafter is output bit by bit in synchronism with fundamental clock signal $\phi 1$. The serial data output from P/S converter 234 is supplied to combine circuit 36 through flip-flop 235, and is converted to 4-bit data "1111" or "0000". The 4-bit data is supplied to segment driver 37 and is displayed on liquid crystal display panel 3. For example, a message "ATTEND AN URGENT MEETING AT XY TRADING CO., AT 14:30" shown in FIG. 12 is displayed on liquid crystal display panel 3. In step D2, if the current mode is the TV ON mode, the TV image and the message are superimposed and displayed in step D4. More specifically, in the TV ON mode, all gate circuits 361 to 364 and 369 in combine circuit 36 shown in FIG. 7 are opened. Therefore, OR gates 365 to 368 mix the TV video data output from A/D converter 33 and message data sent from display buffer 27 through CPU 23, and outputs the composite data to segment driver 37. Thus, the TV image and the message are superimposed and displayed on the TV screen. In step D5, after the message display is performed within 20 seconds, it is cleared. The receive interruption processing is completed, and the flow returns to the HALT state in step B1. When the TV image data and the message data are mixed in step D4, their timings must be coincided with each other. For this purpose, as shown in FIG. 6, CPU 23 causes the operation timings of address counter 231 and P/S converter 234 to coincide with that of common driver 38 (FIG. 2), so that the message data can be correctly displayed on liquid crystal display panel 3.

When a message stored in message memory 26 is to be checked in a case other than the receive interruption mode, message key 10 is operated in the TV OFF mode. Upon operation of message key 10, interruption in step B21 is made. In step B22, the message is read out from message memory 26 and is read out and displayed in the same manner as in step B18. In this case, the message stored in message register 1 in message memory 26 is read out first. When the operator wants to see a message stored in other message registers, he operates search key *7a* or *7b*. Upon operation of search key *7a* or *7b*, interruption in step B9 is made. It is then checked in step B10 if the current mode is the message display mode or TV mode. In this case, since the message display mode is selected, the flow advances to step B12, and display data is switched. More specifically, upon operation of search key *7a* or *7b*, message registers 1 to N in message memory 26 are sequentially selected, and message data stored in the selected message register is read out to display buffer 27 to be sequentially displayed on liquid crystal display panel 3.

When the displayed message is to be cleared, clear key 11 is operated. Upon operation of clear key 11, interruption in step B23 is made. In step B23, the message displayed on the screen is cleared (data in register is kept held).

Liquid crystal display panel 3 has back light 39. Back light 39 is turned on/off upon operation of light key 9. When light key 9 is operated, interruption in step B25 is made. In step B26, back light 39 is turned on or off.

Processing operations such as interruption, receive interruption and the like are performed in response to operated keys. Even if the paging operation is performed in the TV reception mode, the message is superimposed and displayed on the TV image.

In the first embodiment, when receive interruption in step B15 is made while TV video data is received, a message is superimposed and displayed on a TV image.

Figure 13:
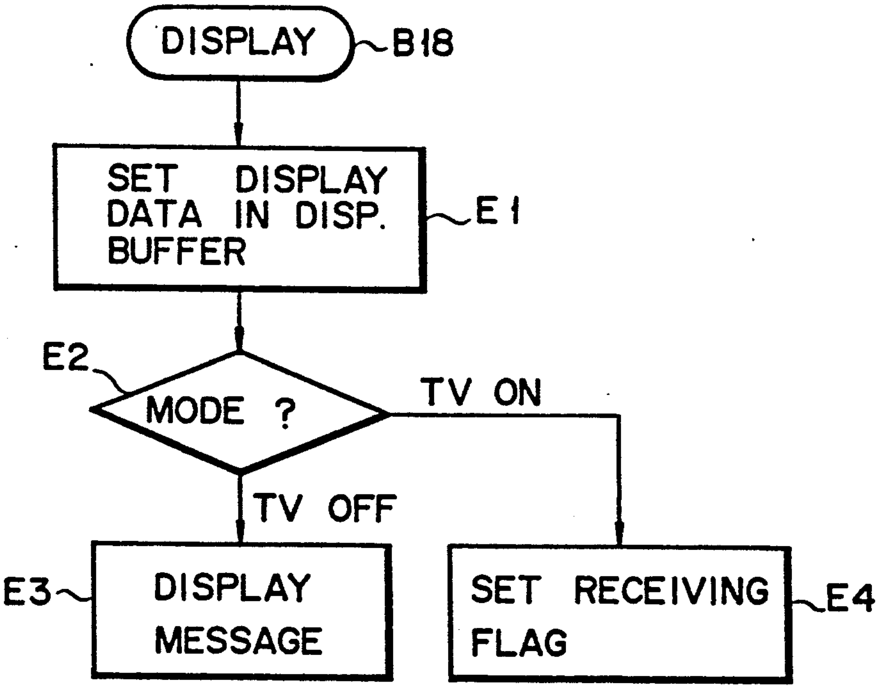
FIG. 13 is a flow chart showing in detail a display processing step according to a second embodiment of the present invention.

Instead, after the display of the TV image is completed, message data may be displayed on liquid crystal display panel 3. A second embodiment for performing such message display will be described below. In this embodiment, when receive interruption in step B15 is made, after the message read operation in step B15 and the alarm operation in step B16 are performed, CPU 23 performs display processing in step B18. CPU 23 sets display data in display buffer 27 in step E1 shown in FIG. 13. More specifically, message data stored in message memory 26 during the latest paging operation is read out, and is written in display buffer 27. It is checked in step E2 if the TV ON or OFF mode is set. If the TV OFF mode is selected, the message data written in display buffer 27 is immediately read out and is displayed on liquid crystal display panel 3 (step E3). If it is determined in step E2 that the TV ON mode is selected, a receipt flag is set in flag memory F in CPU 23 (step E4). Thereafter, the flow returns to the HALT state in step B1.

When the operator switches to the "TV OFF" mode using TV reception mode switch 6, the TV is turned off by interruption processing operations in steps B2, B3, and B4 in FIG. 9. It is then checked in step B7 if the receipt flag is set in the flag memory. If NO in step B7, the flow returns to the HALT state. If YES in step B7, the flow advances to step B8, and message data stored in display buffer 27 is read out and is displayed on liquid crystal display panel 3. The displayed message is cleared by operating clear key 11, as described above.

In the first and second embodiments as described above, the hand-held TV and the pager are combined so that a message of the paging operation can be displayed on a display device of the TV. Therefore, a long message can be simultaneously displayed on a large screen. For this reason, a message becomes easy to see, and can be reliably read. In the first embodiment, when a message is received while an operator watches the TV program, the message is superimposed on the TV image. Thus, the message can be reliably confirmed without being missed.

In the second embodiment, when a message is received while the operator watches the TV program, an alarm is made to inform the operator of reception, and the message is displayed after the TV is turned off. Therefore, the message can be transmitted without interfering with TV watching.

In the first and second embodiments, a monochromatic message is displayed. A third embodiment associated with a pager capable of displaying a colored message will be described hereinafter.

The pager according to the third embodiment has the same outer appearance as that shown in FIG. 1.

Figure 14:
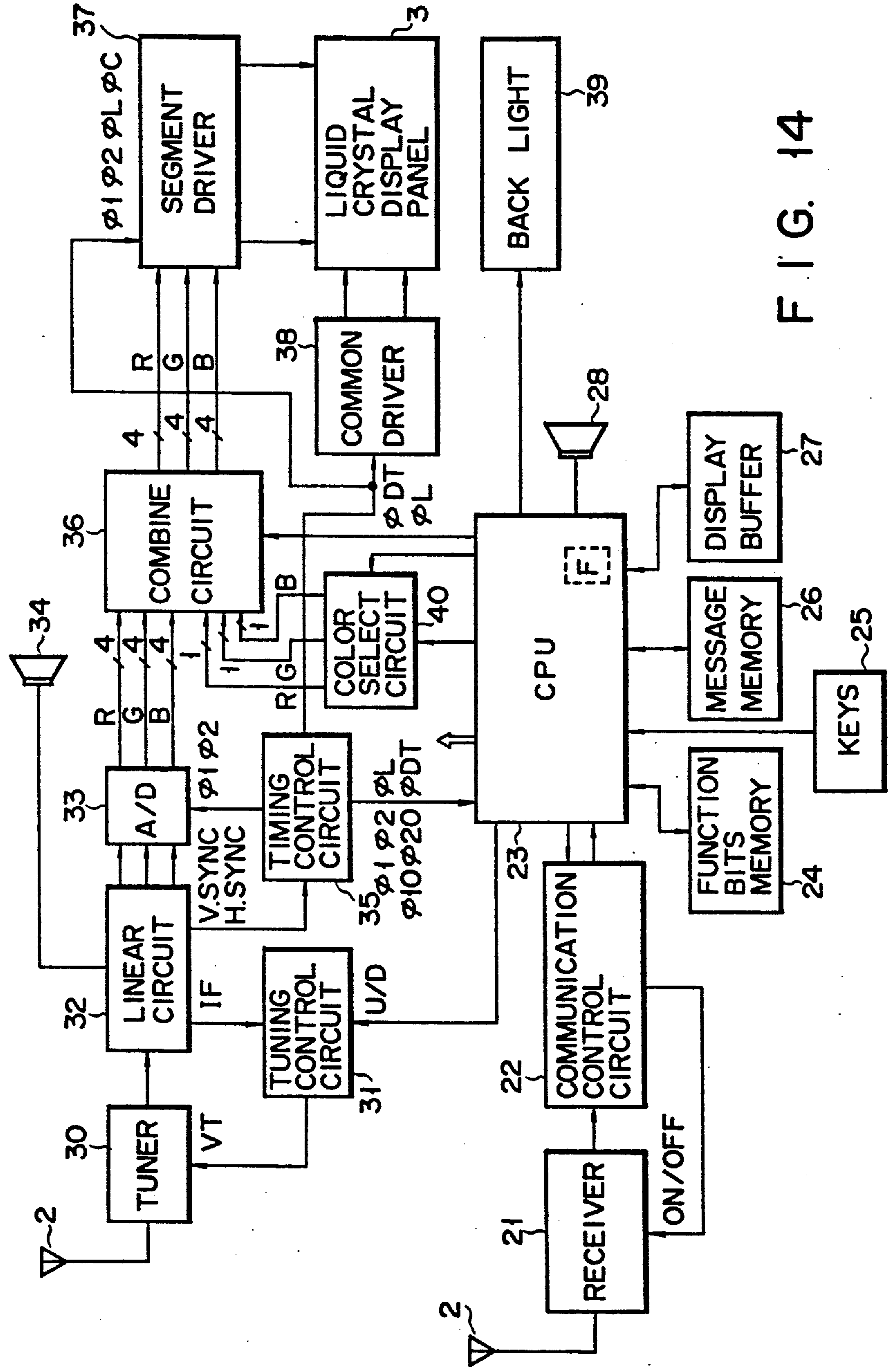

An electronic circuit of the pager according to the third embodiment will be described with reference to FIG. 14. The main portion of FIG. 14 is the same as that in FIG. 2. The same reference numerals in FIG. 14 denote the same parts as in FIG. 2, and a detailed description thereof will be omitted.

In the third embodiment, linear circuit 32 comprises an intermediate frequency amplifier, a video detector, a chroma circuit, an audio detector, an audio amplifier, a sync separator, and the like. Linear circuit 32 outputs a portion of an intermediate frequency signal output from the intermediate frequency amplifier to tuning control circuit 31, R (red), G (green), and B (blue) color signals output from the chroma circuit to A/D converter 33, an audio signal output from the audio amplifier to loudspeaker 34, and vertical sync signal V.SYNC and horizontal sync signal H.SYNC output from the sync separator to timing control circuit 35.

A/D converter 33 samples color signals R, G, and B sent from linear circuit 32 in synchronism with fundamental clock signals $\phi 1$ and $\phi 2$, and converts them into 4-bit video data. Converter 33 supplies the 4-bit data to combine circuit 36. Combine circuit 36 receives message data stored in message memory 26 which is read out by CPU 23 and a predetermined display color of which is designated by color selection circuit 40. The message data is sent bit by bit in units of R, G and B color signals. Combine circuit 36 converts 1-bit data "0" into 4-bit data "0000" and 1-bit data "1" into 4-bit data "111". Combine circuit 36 selects one of the video data from A/D converter 33 and message data sent from CPU 23 through color selection circuit 40 in response to a switching signal from CPU 23, and outputs the selected data to segment driver 37.

Figure 15:
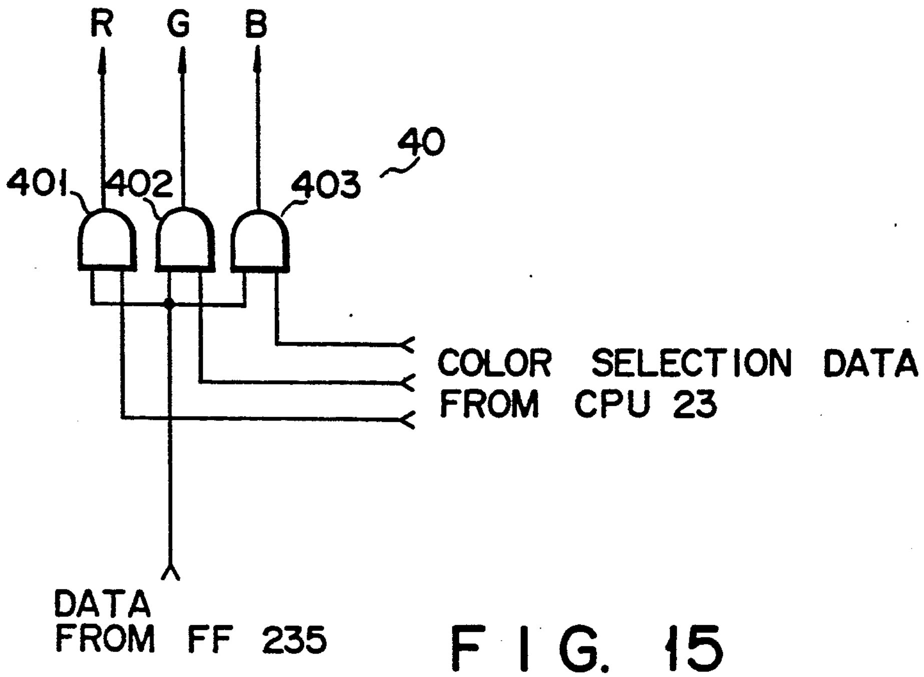

Color selection circuit 40 comprises AND gates 401, 402, and 403, as shown in FIG. 15 in detail. One input terminal of each of AND gates 401 to 403 commonly receives display data sent from CPU 23, i.e., display data output from flip-flop 235 shown in FIG. 6. The other input terminal of each of AND gates 401 to 403 receives color selection data sent from CPU 23. One of AND gates 401 to 403 is selected in accordance with the color selection data, and hence, a display color of the display data sent from CPU 23 is designated.

Figure 16:
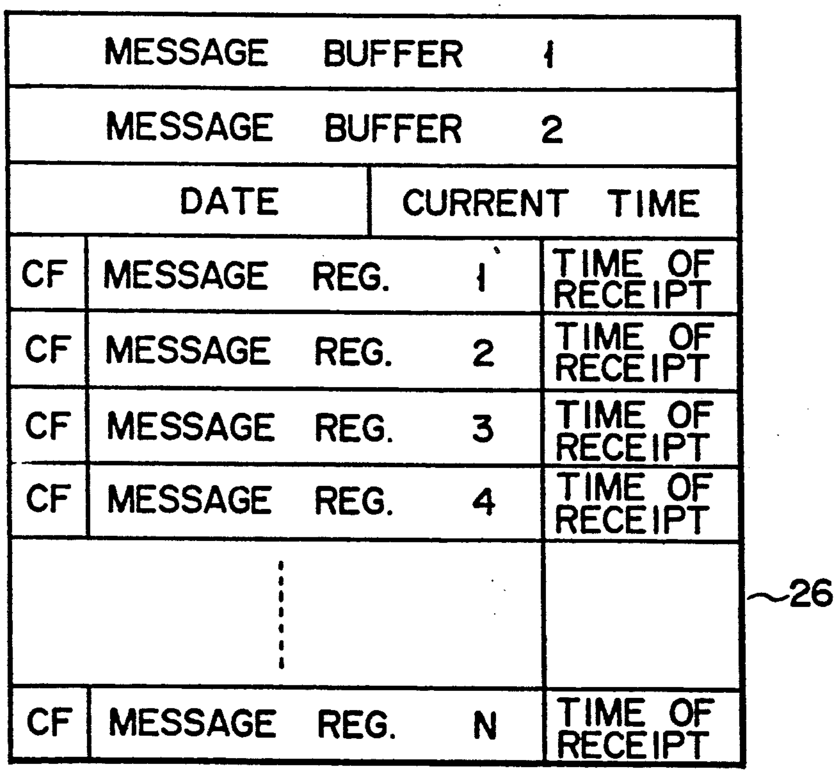

FIG. 16 shows in detail message memory 26 shown in FIG. 14. Message memory 26 includes message buffers 1 and 2, a date area for storing a present date, a present time area for storing a present time, and message registers 1 to N. Each of message registers 1 to N has a flag area for storing color flag CF and a reception time area for storing a reception time of alarm data. In this embodiment, the received message is temporarily stored in message buffer 1 or 2, and thereafter, is written in message register 1. Data stored in message register 1 in this case is shifted to register 2, and data stored in final register N is shifted out and erased. Two message buffers 1 and 2 are included in message memory 26 for the reason that the received messages are alternately stored in message buffers 1 and 2 and the stored messages are compared with one another to thereby determine whether they are the same or not.

The operation of the page according to the third embodiment will be described below. When the power switch of the pager is turned on, communication control circuit 22 performs communication control. The operation of communication control circuit 22 is the same as that in the first embodiment. The operation of CPU 23 in the third embodiment is also basically the same as that shown in FIG. 9, and only the feature of this embodiment will be described below. When the power supply of the pager is turned on by main switch 4, CPU 23 is set in the HALT state as shown in step B1 in FIG. 9. In this state, when TV reception mode switch 6 is set in the "VHF ON" or "UHF ON" mode, the TV reception circuit system shown in FIG. 14 is turned on. A broadcast radio wave of a designated channel among those received at antenna 2 is selected by tuner 30, and the selected signal is supplied to linear circuit 32. Color signals R, G, and B output from linear circuit 32 are respectively converted to 4-bit digital data by A/D converter 33, and these data are supplied to combine circuit 36. In the Tv reception mode, combine circuit 36 is switched to select the output data from A/D converter 33 in response to the control signal from CPU 23. Thus, video data output from A/D converter 33 is supplied to segment driver 33 and is displayed on liquid crystal display panel 3. In this case, common driver 38 generates a common signal based on the timing signal from timing control circuit 35, and sequentially and selectively drivers the common electrodes of liquid crystal display panel 3.

When paging reception is performed, communication control circuit 22 outputs a reception interrupt signal. In response to the reception interrupt signal, CPU 23 performs receive interruption shown in step B15, and performs message read processing in step B16.

Figure 17A:
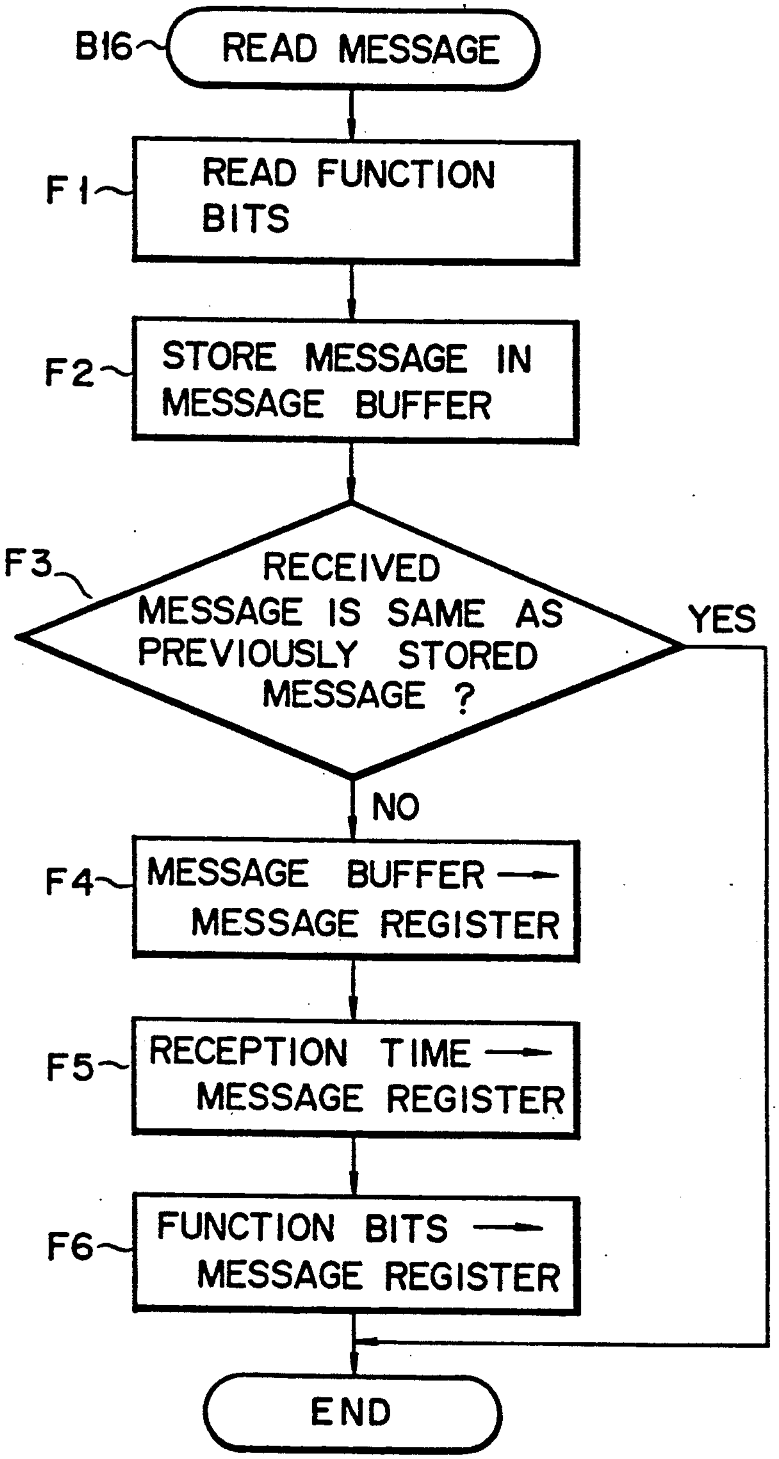
FIGS. 17A and 17B are flow charts showing in detail message read operations in different embodiments.
Figure 17B:
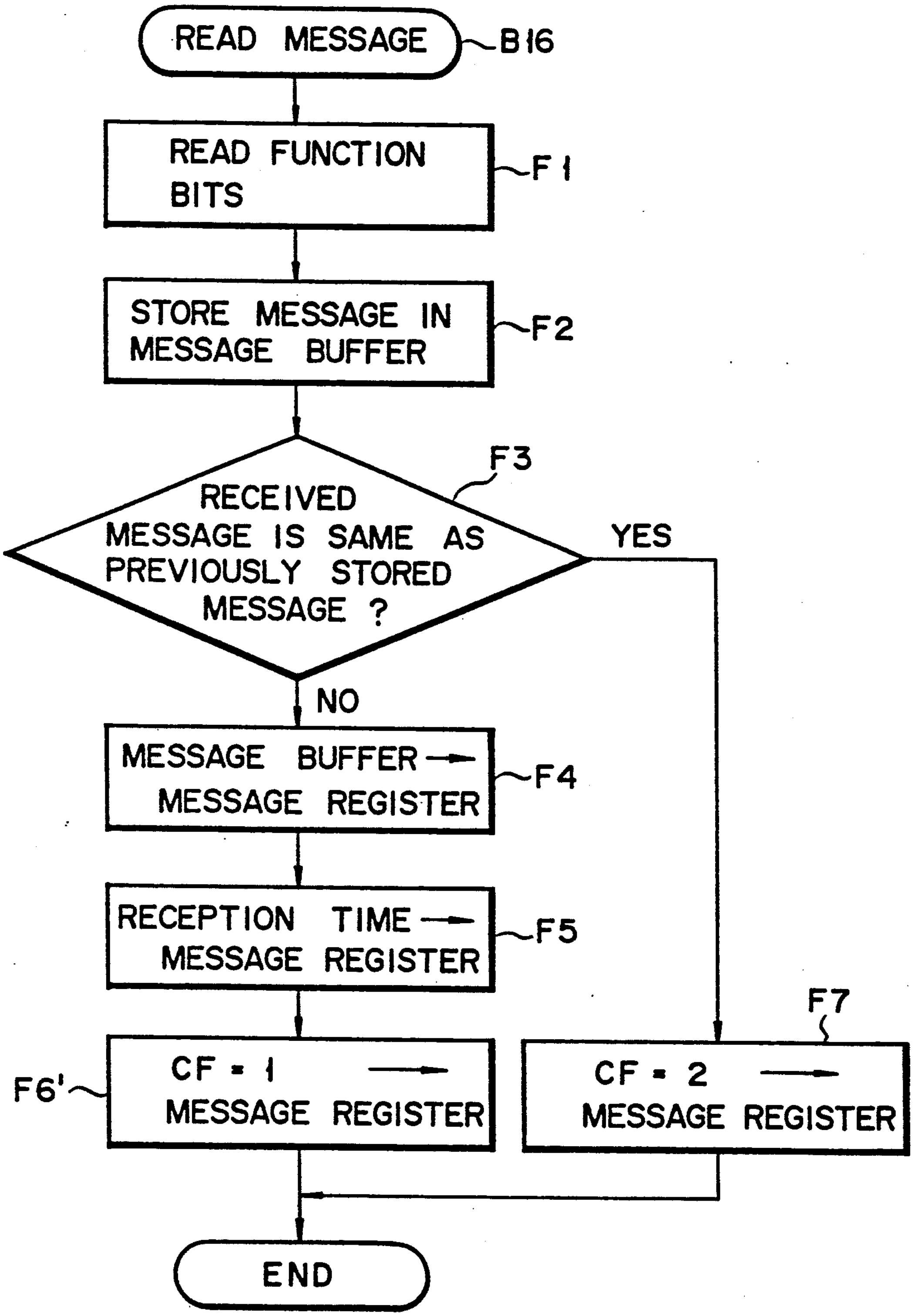

The message read processing will be described with reference to the flow charts shown in FIGS. 17A and 17B. FIGS. 17A and 17B show different embodiments. In the embodiment shown in FIG. 17A, function bits are stored in function buffer 24 (step F1). 8-bit serial data is then stored in message buffer 1 or 2 in message memory 26. CPU 23 checks if the currently received message is the same as that received previously (steps F2 and F3). If YES in step F3, the processing is ended. However, if NO in step F3, a message held in message buffer 1 or 2 is written in message register 1. In this case, the data stored in message registers 1, 2, . . . , are shifted toward the lower-order registers. A message reception time is written in the reception time area of message register 1 (step F5). In addition, the function bits are set in message register 1 (step F6), thus completing the message read processing.

Differences between the embodiments shown in FIGS. 17B and 17A are that the function bit is set in message register 1 in step F6 in the embodiment shown in FIG. 17A, while "1" is set in color flag CF of message register 1 as shown in step F6', and that if it is determined in step F3 that the presently received message is the same as that received previously, "2" is set in color flag CF in message register 1. That is, a display color is changed in accordance with the number of times of reception of an identical message. When the message read processing is ended, control advances to step B17 shown in FIG. 9.

In step B17, an alarm operation is performed. When the processing in step B17 is completed and the alarm is turned off, display processing shown in step B18 is executed.

Figure 18:
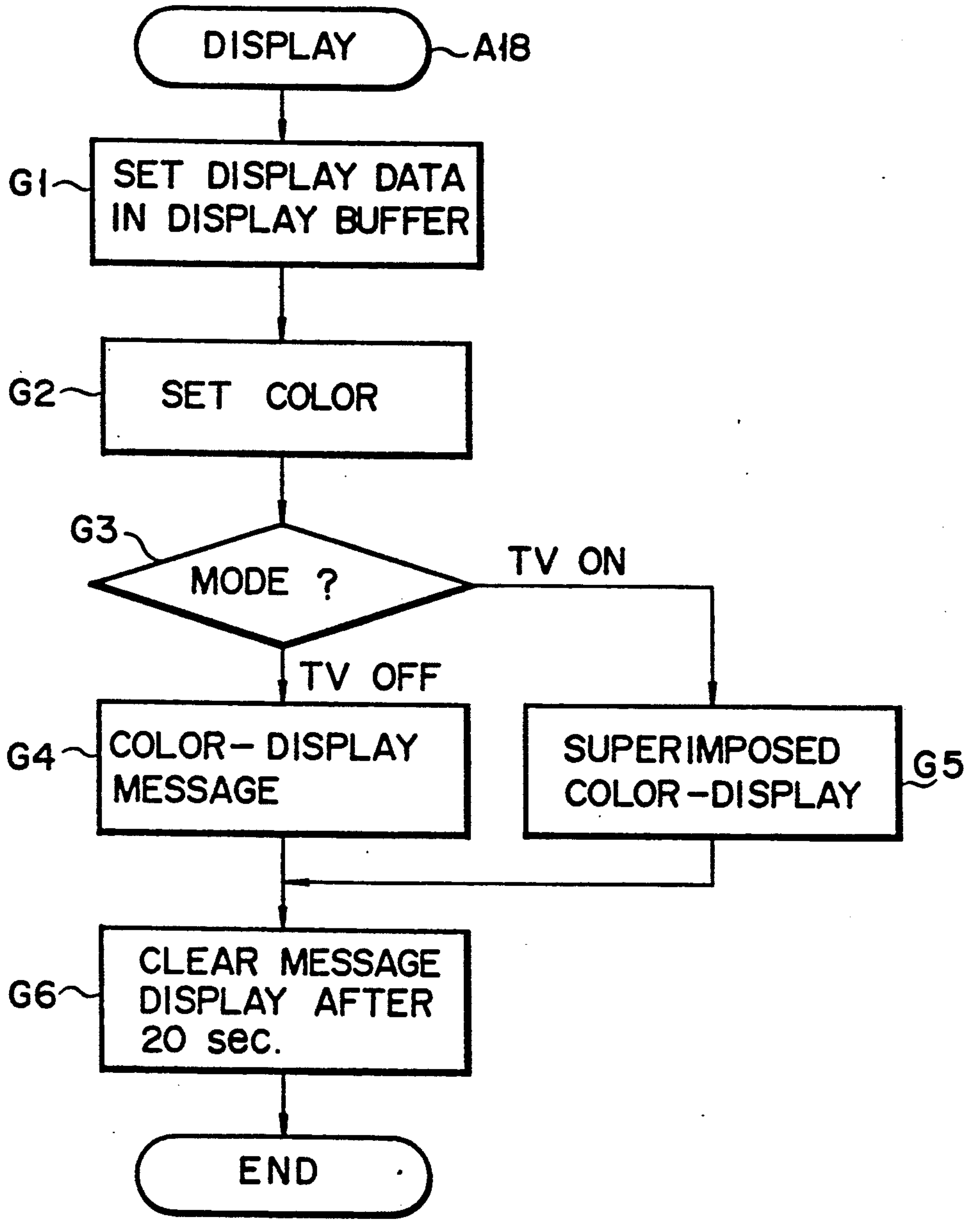

The display processing in step B18 is performed in accordance with the flow chart shown in FIG. 18. In step G1, display data is set in display buffer 27. Message data stored in message register 1 in message memory 26 is read out, and is written in a lower portion of display buffer 27, as shown in FIG. 12. CPU 23 then sets a display color in accordance with the condition at that time, as shown in step G2. A variety of methods of setting a display color may be employed and will be described later in detail. After the display color is set, CPU 23 checks in step G3 if the TV ON or TV OFF mode is selected. If the TV OFF mode is selected, the flow advances to step G4, and message data held in display buffer 27 is read out, and is color-displayed on liquid crystal display panel 3 in accordance with the designated display color. More specifically, in FIG. 6, message data stored in display buffer 27 are sequentially read out in accordance with count values of address counter 231. The readout data is input to character generator 232, and is converted to 6-bit character data. The character data is latched by P/S converter 234 in response to latch clock signal $\phi L$. Thereafter, the latched data is output bit by bit in synchronism with fundamental clock signal $\phi 1$. The serial data output from P/S converter 234 is supplied to color selection circuit 40 through flip-flop 235. Color selection circuit 40 selects one of AND gates 401 to 403 in accordance with color selection data from CPU 23, as shown in FIG. 15 in detail. Thus, the display color of display data output from CPU 23 is designated, and the data is sent to combine circuit 36. combine circuit 36 converts R, G, and B bit data into 4-bit data "1111" or "0000", and outputs the converted data to segment driver 37 through one of R, G, and B lines corresponding to the designated display color. For example, a message "ATTEND AN URGENT MEETING AT XY TRADING CO., AT 14:30" shown in FIG. 12 is color-displayed on liquid crystal display panel 3. If it is determined in step G3 that the current mode is the TV ON mode, the flow advances to step G5, and the message is color-displayed to be superimposed on the TV image. More specifically, in the TV ON mode, combine circuit 36 mixes TV video data output from A/D converter 33 and message data sent from display buffer 27 through CPU 23, and the composite data is output to segment driver 37. Thus, the message can be color-displayed to be superimposed on the TV image. In step G6, after the message display is performed for 20 seconds, the displayed message is cleared. Thus, the receive interruption processing is completed, and control returns to the HALT state in step B1.

Detailed embodiments of color setting processing by CPU 23 in step G2 will be described hereinafter with reference to the flow charts shown in FIGS. 19A to 19D. FIGS. 19A to 19D show different embodiments.

Figure 19A:
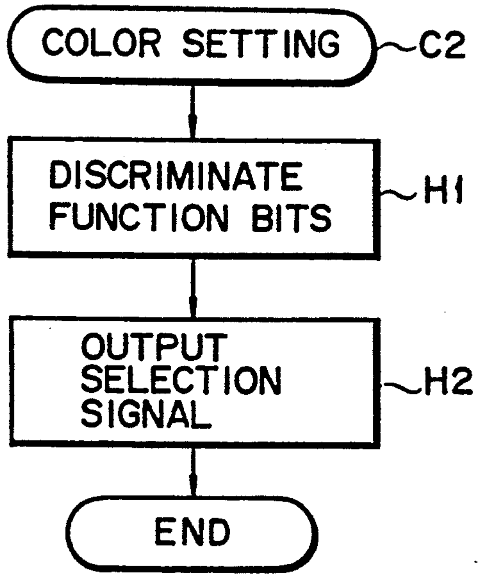
FIGS. 19A to 19D are flow charts showing color setting processing operations.
Figures 20, 21:
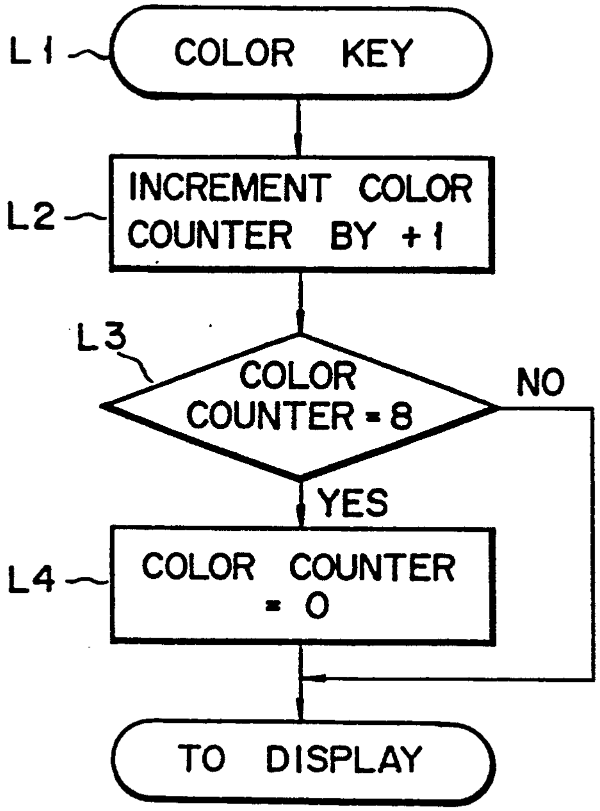

In the embodiment shown in FIG. 19A, the function bits in received data are discriminated (step H1), and a selection signal is output to color selection circuit 40 in accordance with the discrimination result (step H2). The function bits are two bits, as shown in FIG. 21, and four colors, i.e., "black", "green", "blue", and "red", are designated in accordance with "00" to "11". These colors respectively represent different types of communications, i.e., "normal contact", "private contact", "home contact", and "urgent contact".

Figure 19B:
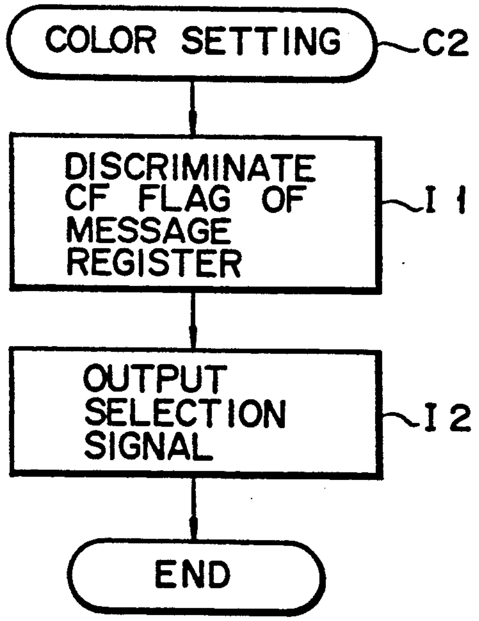

In the embodiment shown in FIG. 19B, the color flag CF of message register 1 (to N) in message memory 26 (FIG. 16) is discriminated (step I1), and a color selection signal is output to color selection circuit 40 in accordance with the discrimination result (step I2). In this case, since color flag CF is set to be "1" or "2" by the processing shown in FIG. 17B, the color selection signal is output in accordance with the set value.

Figure 19C:
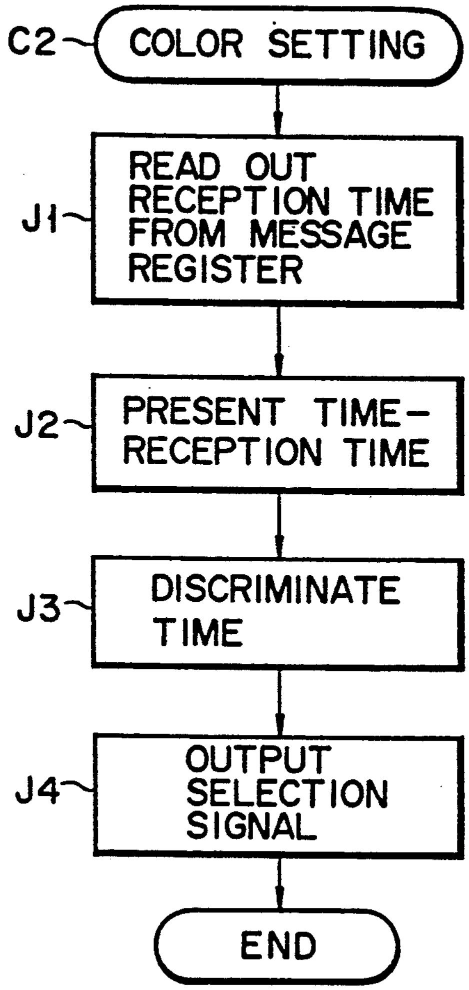
Figures 22, 23:
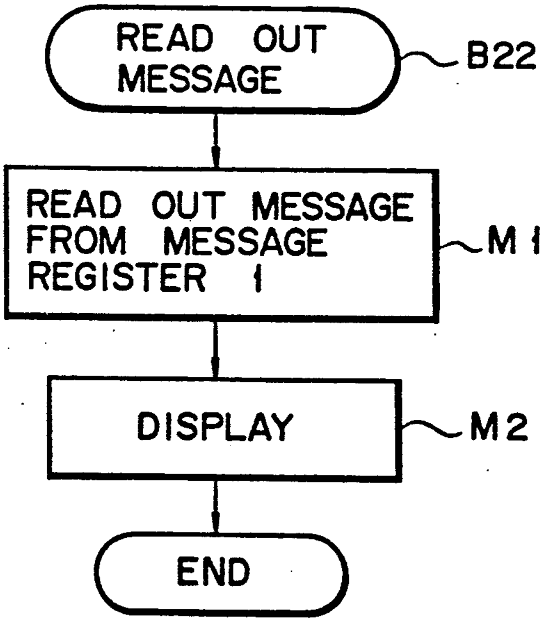

In the embodiment shown in FIG. 19C, reception time stored in message register 1 (to N) in message memory 26 is read out (step J1), and a difference between the reception time and the present time is calculated (step J2). The time difference is discriminated (step J3) to output a color selection signal to color selection circuit 40 (step J4). More specifically, the display color is changed in accordance with elapsed time from reception of a message. For example, as shown in FIG. 22, when the elapsed time is within 20 minutes, a message is displayed in black; when it is within 1 hour, blue; when it is within 2 hours, green; and when it is over 2 hours, red.

Figure 19D:
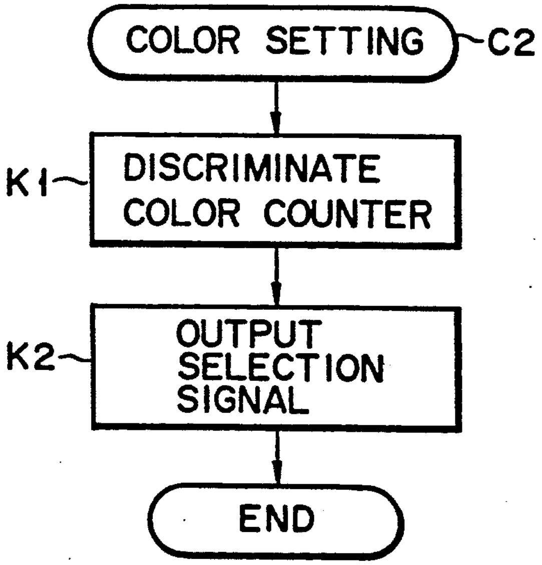

In the embodiment shown in FIG. 19D, the count value of, e.g., an octal color counter arranged in CPU 23 is discriminated (step K1), and a color selection signal is output to color selection circuit 40 in accordance with the discrimination result (step K2).

When the color setting operation shown in FIG. 19D is performed, the octal color counter is arranged in CPU 23, and a color key is provided to key input unit 25. Processing shown in FIG. 20 is executed upon operation of the color key. When the color key is operated at key input unit 25 (step L1), the color counter is incremented by "+1" (step L2) and it is checked if the count value has reached "8" (step L3). If NO in step L3, the flow advances to display processing step B18 shown in FIG. 9. If YES in step L3, the color counter is reset to "0", and the flow advances to display processing step B18. More specifically, in this embodiment, when the color key is depressed, interruption is performed, and each time the key is operated, the color counter is incremented between 0 to 7. Therefore, when the display processing flow is executed thereafter, color designation is made in accordance with the content of the color counter. Thus, each time the color key is depressed, one of eight display colors is cyclically selected. Upon operation of the color key, the display color can be desirably designated.

When the operator wants to see a message stored in message memory 26 in a case other than the receive interruption mode, message key 10 is operated in the TV OFF mode. Upon operation of message key 10, interruption in step B21 is made, and in step B22, message read out processing and display processing (steps M1 and M2) are performed, as shown in FIG. 23, in the same manner as in step B18. In this case, a message stored in message register 1 in message memory 26 is read out and displayed. When the operator wants to see a message stored in other message register, he operates search key 7*a* or 7*b*. Upon operation of search key 7*a* or 7*b*, interruption in step B9 is made, and it is checked in step B10 if the current mode is the message display mode or the TV mode. In this case, since the message display mode is set, the flow advances to step B12, and display data is switched. More specifically, upon operation of search key 7*a* or 7*b*, message registers 1 to N in message memory 26 are sequentially selected, and message data stored in the selected message register is read out to display buffer 27. Then, the readout data is sequentially displayed on liquid crystal display panel 3.

In this manner, even when a message is received while a TV image is received, the message can be color-displayed on the TV screen.

As described above, according to the third embodiment, since alarm data is color-displayed, identification of a message can be satisfactorily improved.

When a display color is set in accordance with received alarm data, the contents of alarm data can be identified in accordance with display colors.

Since a display color is set in accordance with an elapsed time from reception of alarm data, the elapsed time from reception of the data can be easily confirmed in accordance with a displayed color.

Since a means for setting a display color in response to a key input is arranged, a message can be set with an arbitrary color.

Since a means for setting a display color in accordance with the number of times of reception of identical alarm data is arranged, the number of times of reception of identical alarm data can be confirmed in accordance with the display color.

A pager according to the present invention comprises a TV signal receiving means, and can simultaneously or separately color-display a TV image and received alarm data.

The third embodiment does not always require a TV receiver, and is effective for a pager without the TV receiver. However, a display device must be a color display.

In general, a TV image must have many gray scale levels, and requires a bright screen. However, message display does not requires such a bright screen. Thus, back light 39 can always be turned on during TV reception. In this case, step BA1 for turning on the power supply of the back light is added after steps B5 and B6 in the flow chart of FIG. 9, as indicated by a broken line.

Similarly, the power supply for feeding power to back light 39 is interlocked with main switch 4. When switch 4 is slid to set the VHF or UHF selection mode, back light 39 can be automatically powered regardless of the operation of CPU 23.

What is claimed is:

1. A pager with a television function, comprising:

television receiving means for receiving a television signal;

a display means, having red pixels, green pixels and blue pixels, for displaying a color image;

an analog-to-digital conversion circuit for converting the television signal received by said television receiving means to a digital red-green-blue signal indicating a display color of a television image;

message receiving means for receiving a calling signal including signal data and a color signal indicating a display color of the message data;

control means for decoding the calling signal received by said message receiving means, and for generating message data and color selection data including a red designating signal indicating a lighting of a red pixel, a green designating signal indicating a lighting of a green pixel and blue designating signal indicating a lighting of a blue pixel;

message color selection means for generating a message red-green-blue signal indicating a display color of a message in response to the color selection data, said message color selection means including first, second and third gate means, said first gate means receiving the message data and the red designating signal, said second gate means receiving the message data and the green designating signal, and said third gate means receiving the message data and the blue designating signal, said first to third gate means outputting the message data in response to the red, green and blue designating signals as the message red-green-blue signal; and synthesizing means for synthesizing the digital red-green-blue signal supplied from said analog-to-digital conversion circuit and the message red-green-blue signal supplied from said color selection means;

said display means displaying the television signal received from said television signal receiving means or the message data received by said message receiving circuit in response to a signal supplied from said synthesizing means.

2. The pager according to claim 1, wherein said control means includes means for changing a display color of the message data by changing the color selection data.

3. The pager according to claim 1, wherein a digital RGB signal output from said analog-to-digital conversion circuit includes an n-bits red signal indicating gradation of the red pixel, an n-bits green signal indicating gradation of the green pixel and an n-bits blue signal indicating gradation of the blue pixel, and wherein the red designating signal, the green designating signal and the blue designating signal are each of 1-bit;

wherein said synthesizing means includes an expansion means which expands each of the output data of said first to third gate circuits to n-bits data, and said synthesizing means outputs one of the outputs of said analog-to-digital conversion circuit and said expansion circuit.

4. A pager with a television function, comprising:

a television receiving circuit for receiving a television signal;

display means for displaying an image;

an analog-to-digital conversion circuit responsive to the television signal received by said television receiving circuit, for converting the received television signal to a digital signal in synchronism with a first clock signal;

a message receiving circuit for receiving a calling signal including a message data;

control means, coupled to said message receiving circuit, for extracting the message data from a received calling signal;

an address counter which is reset in response to a second clock signal (ODT) and which counts-up in response to a third clock signal (OL);

a display buffer having memory areas having a memory capacity corresponding to one frame of the image, for storing character codes to be displayed on said display means, the memory areas being addressed by an output signal of said address counter;

a character generator, for generating character pattern data in parallel in response to character codes which are output from said display buffer and an output signal from said address counter;

a parallel-serial conversion circuit for latching the character pattern data in synchronism with the third clock signal (ODT), for converting a latched parallel signal to a serial signal, and for outputting the serial signal in synchronism with the first clock signal;

a synthesizing circuit for synthesizing the serial signal from said parallel-serial conversion circuit and said analog-to-digital conversion circuit, and for outputting a display signal; and a timing signal generating circuit for generating the first to third clock signals;

said display device displaying a television image received from said television receiving circuit and received message data received by said message receiving circuit in response to a display signal supplied from said synthesizing circuit, said display device including a scanning electrodes and signal electrodes, and starting a scanning of the scanning electrodes in synchronism with the second clock signal, and scanning the scanning electrodes in synchronism with the third clock signal.

* * * * *